US012634177B1

(12) United States Patent
Ying

(10) Patent No.: US 12,634,177 B1
(45) Date of Patent: May 19, 2026

(54) N-PATH BASEBAND DOWN-CONVERSION WITH BIAS CURRENT STEERING AND SINUSOIDAL VOLTAGE DRIVERS FOR TRANSISTOR COMMUTATION

(71) Applicant: HRL Laboratories, LLC, Malibu, CA (US)

(72) Inventor: Robin C. Ying, Alhambra, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 18/822,000

(22) Filed: Aug. 30, 2024

Related U.S. Application Data

(60) Provisional application No. 63/635,449, filed on Apr. 17, 2024.

(51) Int. Cl.
H04L 25/08 (2006.01)
(52) U.S. Cl.
CPC .................................... H04L 25/08 (2013.01)
(58) Field of Classification Search
CPC ........................................................ H04L 25/08
See application file for complete search history.

(56) References Cited

U.S. PATENT DOCUMENTS

| | | | | |
|---|---|---|---|---|
| 6,943,618 | B1 * | 9/2005 | Tanji ................... | H03F 3/45479 327/539 |
| 7,457,605 | B2 * | 11/2008 | Thompson ........... | H03D 7/1441 455/313 |
| 2024/0162921 | A1 * | 5/2024 | Chakraborty ........ | H04B 1/0028 |

OTHER PUBLICATIONS

D. Dimlioglu et al.; "Demonstration of a Ku-Band N-Path Downconverter in GaN-on-SiC," Proceedings of the 2023 IEEE BiCMOS and Compound Semiconductor Integrated Circuits and Technology Symposium (BCICTS); pp. 106-109, 2023, IEEE.
Y. Zhu et al.; "A 38-GS/s 7-bit Pipelined-SAR ADC with Speed-Enhanced Bootstrapped Switch and Output Level Shifting Technique in 22-nm FinFET," IEEE Journal of Solid-State Circuits, vol. 58, No. 8; pp. 2300-2313; Aug. 2023, IEEE.
E. Zolkov et al.; "A 1-2-GHz Quadrature Balanced N-Path Receiver for Frequency Division Duplex Systems." IEEE Transactions on Microwave Theory and Techniques, vol. 70, No. 1, pp. 597-612, Jan. 2022.

(Continued)

*Primary Examiner* — Dac V Ha
(74) *Attorney, Agent, or Firm* — Wheatstone IP Law Corporation; Milad G. Shara

(57) ABSTRACT

A receiver circuit comprises a radio frequency (RF) input terminal, a shared current source that draws a shared bias current from a DC voltage supply, a local oscillator (LO) that provides sinusoidal voltage signals, and baseband down-conversion paths that provide baseband down-conversion signals. Each baseband down-conversion path comprises a transistor, a load impedance, and a filter capacitor. The transistor has a drain coupled to the impendence load and the filter capacitor. The drain is configured to provide a mixed signal in response to one of the sinusoidal voltage signals, the shared bias current, and the RF input signal. The filter capacitor provides the baseband down-conversion signal in response to the mixed signal. A method of baseband down-conversion comprises steering the shared bias current to configure the transistor to operate in a saturation mode in response to a time-varying amplitude of the sinusoidal voltage signal at a gate of the transistor.

25 Claims, 16 Drawing Sheets

(56)                    References Cited

OTHER PUBLICATIONS

R. Ying et al.; "A 20-40 GHz High Dynamic Range HBT N-Path Receiver With 8.9 dBm OOB B1dB and 8.55 dB NF Consuming 130 mW," Proceedings of the 2021 IEEE Radio Frequency Integrated Circuits Symposium (RFIC); pp. 215-218, 2021, IEEE.

R. Ying et al.; "Impedance Transparency and Performance Metrics of HBT-Based N-Path Mixers for mmWave Applications," IEEE Transactions on Circuits and Systems I: Regular Papers, vol. 68, No. 5; pp. 2210-2223, May 2021, IEEE.

M. Morton et al.; "The RF Sampler: Chip-Scale Frequency Conversion and Filtering Enabling Affordable Element-Level Digital Beamforming," Proceedings of the IEEE International Microwave Symposium (IMS); pp. 14-18, 2018, IEEE.

R. Ying et al.; "A HBT-Based 300 MHZ-12 GHz Blocker-Tolerant Mixer-First Receiver," Proceedings of the IEEE Bipolar/BiCMOS Circuits and Technology Meeting (BCTM); pp. 31-34, 2017, IEEE.

N.M. Amin et al.; "An I/Q mixer with an integrated differential quadrature all-pass filter for on-chip quadrature LO signal generation", Journal of Semiconductors, vol. 36, No. 5, May 2015, pp. 055001-1 to 055001-9. Chinese Institute of Electronics.

K. Shinohara et al.; "Scaling of GaN HEMTs and Schottky Diodes for Submillimeter-Wave MMIC Applications," IEEE Transactions on Electron Devices, vol. 60, No. 10; pp. 2982-2996, Oct. 2013, IEEE.

C. Andrews et al.; "A Passive Mixer-First Receiver With Digitally Controlled and Widely Tunable RF Interface," IEEE Journal of Solid-State Circuits, vol. 45, No. 12; pp. 2696-2708, Dec. 2010, IEEE.

M. Do et al.; "AlGaN/GaN Mixer MMICs, and RF Front-End Receivers for C-, Ku-, and Ka-Band Space Applications," Proceedings of the 5th European Microwave Integrated Circuits Conference (EuMIC); pp. 57-60, Paris, France, 2010, IEEE.

* cited by examiner

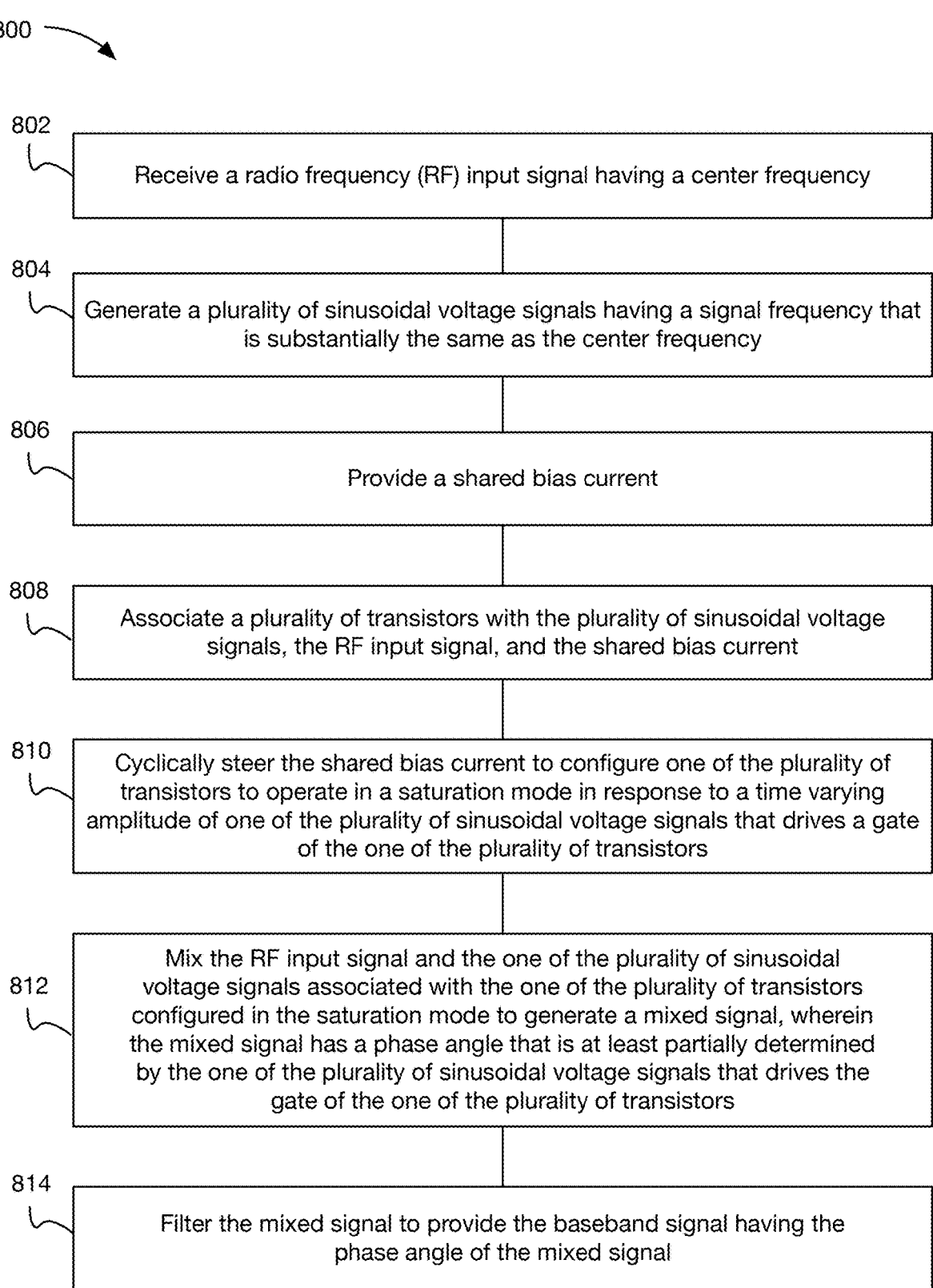

800

802
Receive a radio frequency (RF) input signal having a center frequency

804
Generate a plurality of sinusoidal voltage signals having a signal frequency that is substantially the same as the center frequency 806
Provide a shared bias current 808
Associate a plurality of transistors with the plurality of sinusoidal voltage signals, the RF input signal, and the shared bias current 810
Cyclically steer the shared bias current to configure one of the plurality of transistors to operate in a saturation mode in response to a time varying amplitude of one of the plurality of sinusoidal voltage signals that drives a gate of the one of the plurality of transistors 812
Mix the RF input signal and the one of the plurality of sinusoidal voltage signals associated with the one of the plurality of transistors configured in the saturation mode to generate a mixed signal, wherein the mixed signal has a phase angle that is at least partially determined by the one of the plurality of sinusoidal voltage signals that drives the gate of the one of the plurality of transistors 814
Filter the mixed signal to provide the baseband signal having the phase angle of the mixed signal

FIG. 8

Quadrature Phase-Shifted
Overlapping Sinusoidal Voltage Signals
for FET / HEMT Gate Drivers
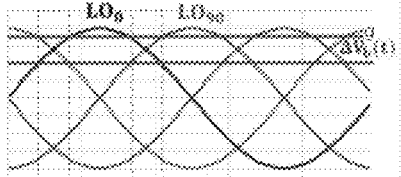
FIG. 11A
Quadrature Phased 25% Duty Cycle
Non-Overlapping Pulsed Voltage Signals
for FET / HEMT Gate Drivers
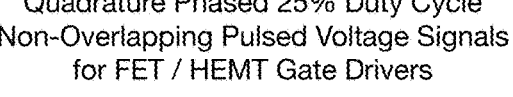
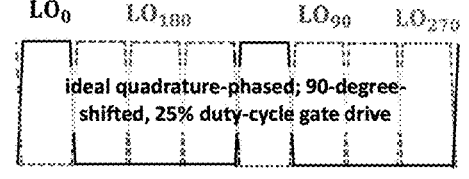
FIG. 12A (Prior Art)
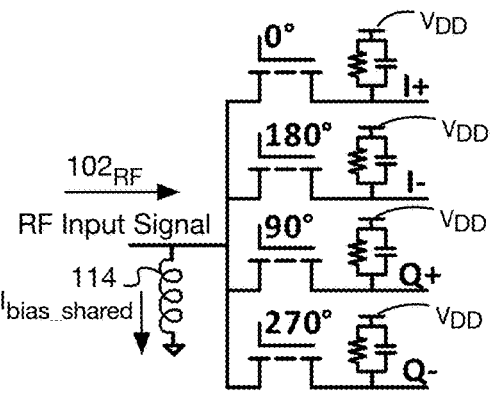
FIG. 11B
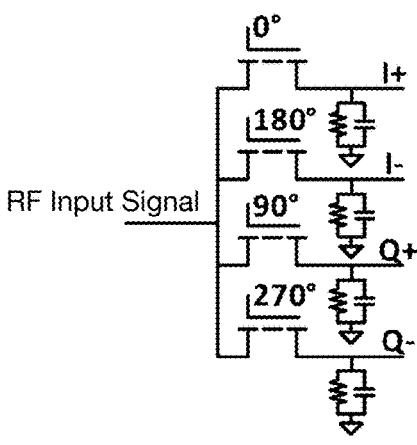
FIG. 12B (Prior Art)
Idealized Model Diagram:
Single Pole Four Throw (SP4T)
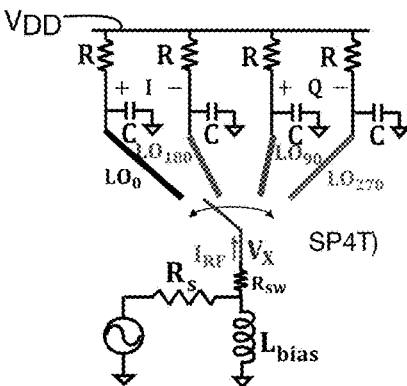
FIG. 11C
Idealized Model Diagram:
Four Single Pole Single Throw (SPST)
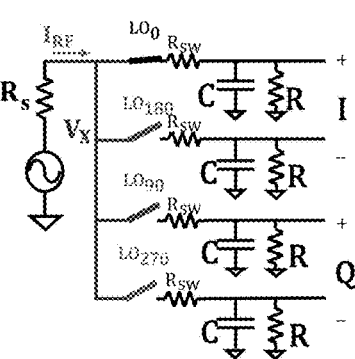
FIG. 12C (Prior Art)

Effect of LO Overlap and Swing on Noise Figure

Effect Swing on Noise Figure with Max Overlap

N-PATH BASEBAND DOWN-CONVERSION WITH BIAS CURRENT STEERING AND SINUSOIDAL VOLTAGE DRIVERS FOR TRANSISTOR COMMUTATION

CROSS-REFERENCE TO RELATED APPLICATIONS

The present application claims priority to U.S. Provisional Application No. 63/635,449 entitled ACTIVE GaN N-PATH FILTER WITH OVERLAP-INDUCED-LOSS SUPPRESSION filed on Apr. 17, 2024, the entirety of which is hereby incorporated by reference.

TECHNICAL FIELD

The present description relates to N-path mixers, N-path filters, and baseband down-conversion of radio frequency input signals in receiver circuits.

BACKGROUND

Down-conversion radio frequency (RF) receivers have N-path mixers that are being developed for mm-wave frequency range. These N-path mixers have parallel transistors that depend on local oscillator (LO) signals to switch between the transistors to provide mixed signals. However, N-path mixers with LO signals such as pulse trains and sinusoids are constrained by power efficiency and noise figure performance demands in the mm-wave frequency range.

There is a need for down-conversion receivers having N-path mixers that satisfy power efficiency and noise figure performance demands in the mm-wave frequency range.

DESCRIPTION OF DRAWINGS

FIG. 8 is a diagram showing a method of converting a radio frequency (RF) input signal to a baseband signal according to an embodiment.

FIGS. 11A-13B are diagrams of mixer architecture and simulation data showing the effect of sinusoidal overlap and swing on noise figure of an active mixer in the receiver circuit of FIG. 10 compared to non-overlapping pulsed signals in a conventional passive mixer.

Like reference symbols in the various figures indicate like elements.

DETAILED DESCRIPTION

Figure 9A:
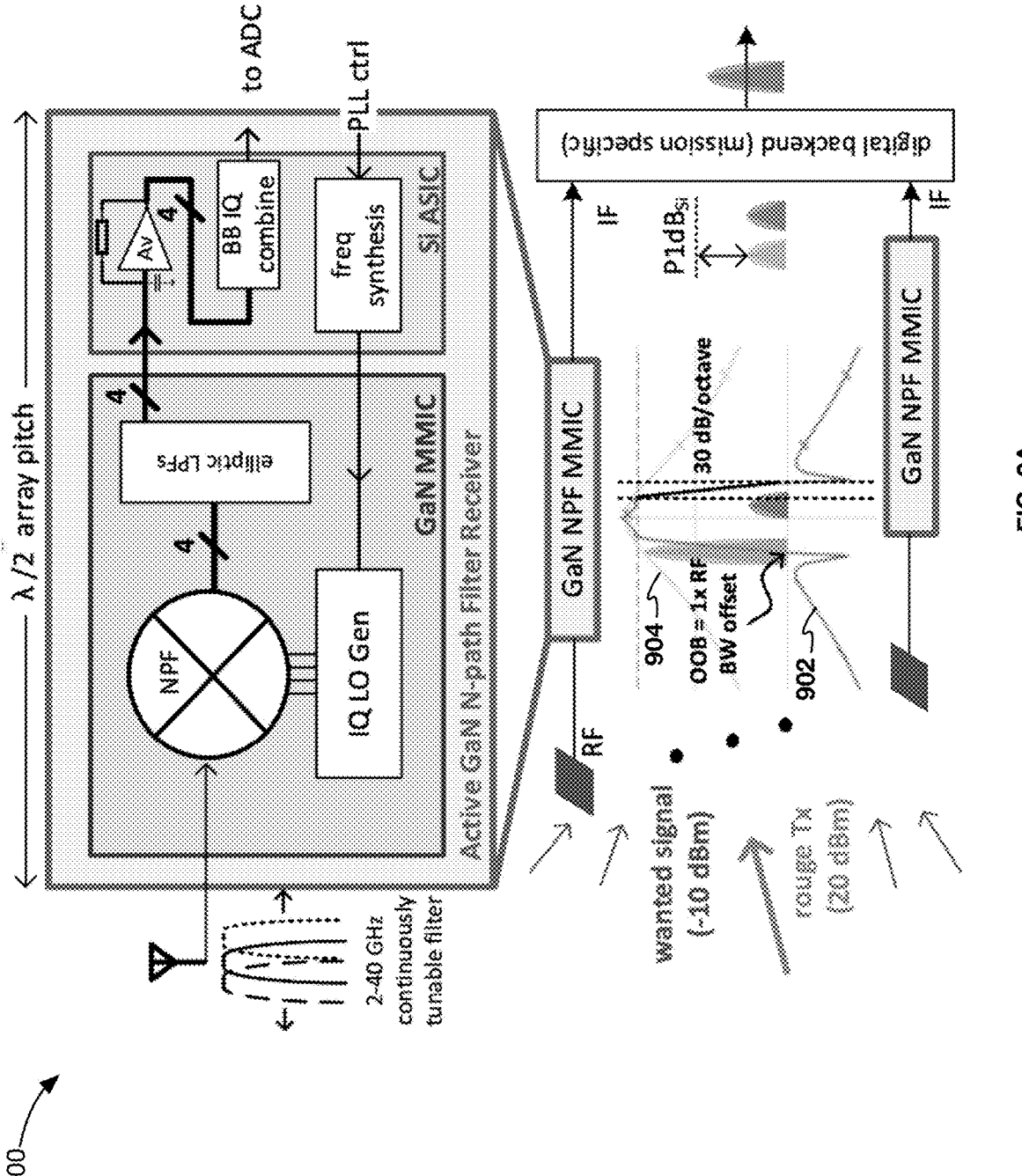
FIG. 9A is a diagram illustrating filter response data for an embodiment of the receiver circuit of FIG. 5.

FIGS. 1 to 8 illustrate receiver circuit embodiments having N-Path baseband down-conversion of a radio frequency (RF) input signal having a center frequency from an antenna. The N-path baseband down-conversion utilizes current steering and overlapping sinusoidal signal voltage gate drivers for transistor commutation in active mixers. FIGS. 9A to 10 illustrate receiver circuits with active mixers configured in quadrature embodiments having simulated and measured data that meet performance requirements for low noise figure, high dynamic input signal range, low power consumption, and wideband operation in the mm-wave frequency range. FIGS. 11A-13B show mixer architecture and noise performance data for embodiments of the active mixer architecture compared to a conventional passive mixer architecture. FIGS. 14A-14D provide additional simulated v. measured data for embodiments of the active N-path mixer/filter illustrated in FIG. 10.

The disclosed embodiments illustrate a high dynamic range receiver design with an active N-path mixer/filter. The embodiments include integrated wideband quadrature generation with an active mixer core. The active architecture allows for relaxed gate drive signal generation allowing for high-dynamic range performance over a decade of tuning range, according to an embodiment. For example, an active 4 phase N-path filter in GaN can achieve noise performance of ~6 dB as well as linearity of >30 dBm P1 dB out-of-band across 2-28 GHz while driven by quadrature-phased sinusoids due to active current-steering architecture according to an embodiment. Also, the embodiments of the ultra-high dynamic range receivers and transceivers with tunable/selectable bands for down-conversion to baseband satisfy demands for higher frequency tuning range, high power handling/linearity, higher sensitivity, and lower power consumption.

According to various embodiments, the RF input signal may have desired and undesired signal components received from an antenna that may operate in the presence of high-power co-site interference from an undesired interference signal. The undesired interference signal may (i) degrade, weaken, or distort the desired input signal in applications such as communication or radar systems, (ii) introduce unwanted noise or disturbance that affects clarity and reliability of the desired input signal, or (iii) cause the receiver or associated devices to malfunction or operate unpredictably. For example, the desired input signal may be a radar signal for electronic support measures (ESM), the undesired interference signal may be emitted from co-site jammers or other emitters, and the receiver with N-path baseband down-conversion may be an electronic intelligence (ELINT) receiver configured to listen for the desired input signal extending through a Ka-band frequency range of approximately 26.5 GHz to 40 GHz according to embodiments.

The disclosed embodiments include an indexed numbering system with subscripts having lowercase letters n and c to identify 1) an $n^{th}$ baseband down-conversion path in a number of N parallel baseband down-conversion paths, where n is an integer 1 to N, and N is an integer of 2 or more, and 2) a $c^{th}$ periodic sinusoidal intersection in a number of C periodic sinusoidal intersections, where C=N. The $n^{th}$ baseband down-conversion path includes an $n^{th}$ transistor, an $n^{th}$ load impedance, and an $n^{th}$ filter capacitor. The $c^{th}$ periodic sinusoidal intersection corresponds to a $c^{th}$ commutation period for transitioning between an $n^{th}$ transistor in a current $n^{th}$ baseband down-conversion path and an $(n+1)^{th}$ transistor in a next $(n+1)^{th}$ baseband down-conversion path.

Figure 1:
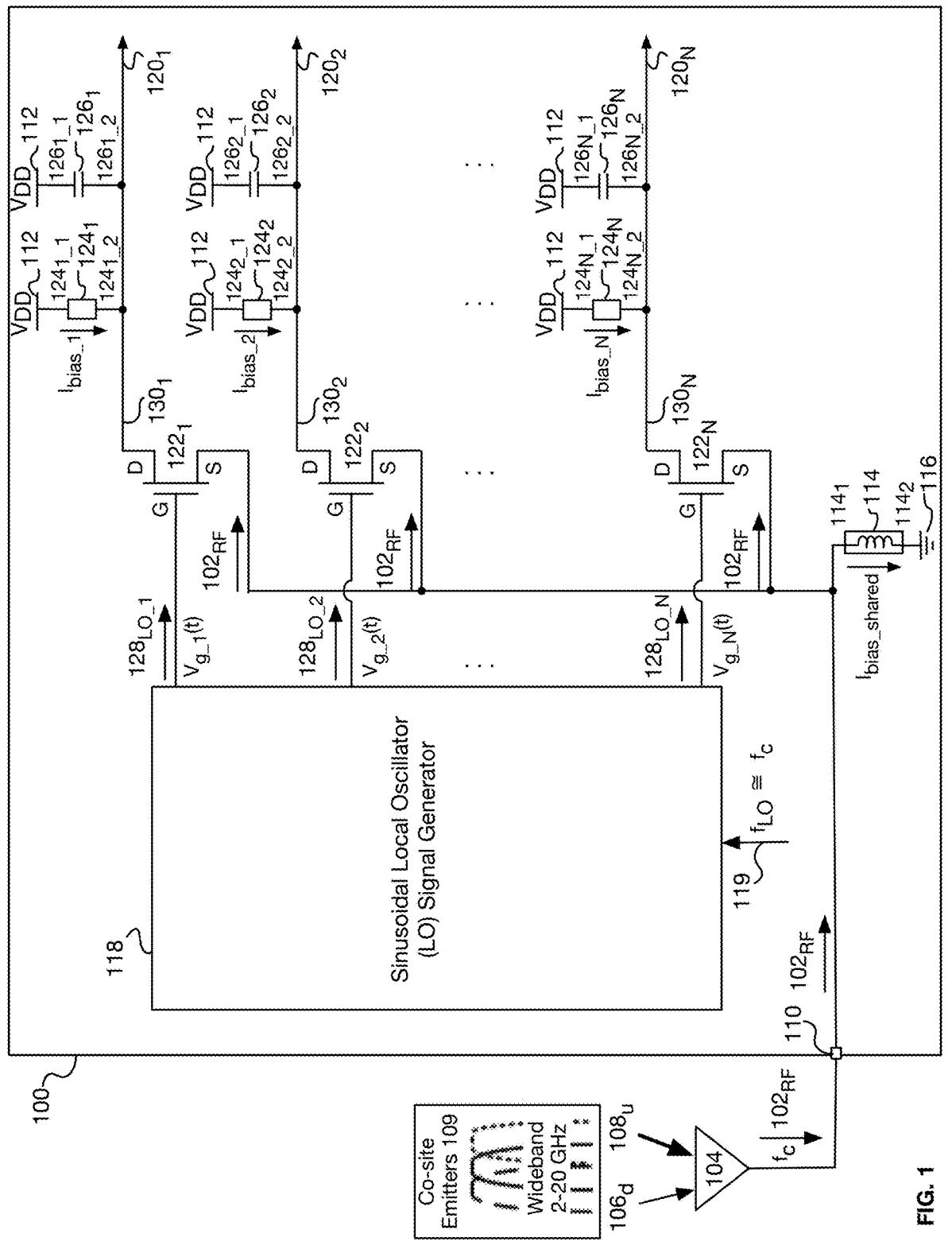
FIG. 1 is a diagram illustrating a receiver circuit having N-Path baseband down-conversion with bias current steering and sinusoidal voltage drivers for transistor commutation according to an embodiment.

FIG. 1 illustrates a receiver circuit 100 for baseband down-conversion of a radio frequency (RF) input signal $102_{RF}$ having a center frequency $f_c$ from an antenna 104 according to an embodiment. The RF input signal $10_{2RF}$ may include a desired or intended input signal $106_d$ and an undesired or unintended interference signal $108_u$ emitted from desired and undesired co-site emitters 109 in close proximity. For example, the desired input signal $106_d$ has the center frequency $f_c$ within a mm-wave frequency range of 2 GHz to 40 GHz, and the desired input signal $106_d$ will typically have a bandwidth occupying less than this range. The undesired interference signal $108_u$ may occupy a distinct spectral portion of the same 2-40 GHz mm-wave range as that occupied by the desired input signal $106_d$.

The receiver circuit 100 includes an RF input terminal 110 configured to receive the RF input signal $102_{RF}$, a direct current (DC) voltage supply rail 112 configured to provide a DC voltage supply VDD, and a shared current source 114 configured to draw a shared bias current $I_{bias\_shared}$ from the DC voltage supply VDD to a ground terminal 116. The ground terminal 116 is coupled to one end $114_2$ of the shared current source 114. The DC voltage supply VDD may be configured as a pull-up supply, and the shared current source 114 may include an inductor configured as an RF choke and a DC biasing inductor shunt to the ground terminal 116 according to an embodiment.

The receiver circuit 100 further includes a sinusoidal local oscillator (LO) signal generator 118 and a plurality of baseband down-conversion paths$_{1:N}$ that are configured to provide a plurality of baseband down-conversion signals $120_{1:N}$. Each baseband down-conversion path in the plurality of baseband down-conversion paths$_{1:N}$ comprises a transistor $122_n$, a load impedance $124_n$, and a filter capacitor $126_n$ configured to generate one of the baseband down-conversion signals $120_n$ in the plurality of baseband down-conversion signals $120_{1:N}$. The load impedance $124_n$ may be a load resistor according to an embodiment. The sinusoidal LO signal generator 118 is configured to generate a plurality of phase-shifted sinusoidal voltage signals $128_{LO\_n}$. Each phase-shifted sinusoidal voltage signal $128_{LO\_n}$ has a signal frequency $f_{Lo}$ that is substantially the same as the center frequency $f_c$ and a time varying amplitude $V_{g\_n}(t)$. The plurality of phase-shifted sinusoidal voltage signals $128_{LO\_1:N}$ includes a phase shift $\Phi$ between each of the phase-shifted sinusoidal voltage signals $128_{LO\_n}$. The phase shift $\Phi$ is determined by the number of baseband down-conversion paths in the plurality of baseband down-conversion paths according to an embodiment. Each phase-shifted sinusoidal voltage signal signals $128_{LO\_n}$ has a phase angle $\theta$ that is determined by the phase shift $\Phi$. The time varying amplitudes are delayed versions of each other.

According to an embodiment, the sinusoidal LO signal generator 118 may be a tunable sinusoidal LO signal generator that generates the plurality of phase-shifted sinusoidal voltage signals $128_{LO\_1:N}$ in response to a single-ended sinusoidal voltage signal 119. The single-ended sinusoidal voltage signal 119 is tuned to have the single frequency $f_{LO}$ that is substantially the same as the center frequency $f_c$ of the RF input signal $102_{RF}$. According to embodiments, the signal frequency may be in a frequency range of 2 GHz to 40 GHz and the transistor 122, in each baseband down-conversion path may be configured to sample a bandwidth of the RF input signal $102_{RF}$ within the frequency range of 2 GHz to 40 GHz.

For each baseband down-conversion path, the load impedance $124_n$ has one end $124_{n\_1}$ coupled to the DC voltage supply rail 112. A source of the transistor $122_n$ is coupled to the RF input terminal 110 and to another end $114_1$ of the shared current source 114. A drain of the transistor $122_n$ is coupled to another end $124_{n\_2}$ of the impendence load $124_n$ and to one end $126_{n\_2}$ of the filter capacitor $126_n$. A gate of the transistor $122_n$ is coupled to the sinusoidal LO signal generator 118 to receive one of the plurality of phase-shifted sinusoidal voltage signals $128_{LO\_n}$. The shared bias current $I_{bias\_shared}$ is steered as a bias current $I_{bias\_n}$ to the transistor $122_n$ in response to the time varying amplitude $V_{g\_n}(t)$ of the one of the plurality of phase-shifted sinusoidal voltages signals $128_{LO\_n}$ associated with the gate of the transistor $122_n$.

The drain of the transistor $122_n$ is configured to provide a mixed signal $130_n$ in response to the time-varying amplitude $V_{g\_n}(t)$ of the one of the plurality of phase-shifted sinusoidal voltage signals $128_{LO\_n}$, the shared bias current $I_{bias\_shared}$, and the RF input signal $102_{RF}$. The filter capacitor $126_n$ is configured to provide the baseband down-conversion signal 120, in response to the mixed signal $130_n$. The mixed signal $130_n$ comprises a sum and difference frequencies of the RF input signal $102_{RF}$ and the one of the plurality of phase-shifted sinusoidal voltage signals $128_{LO\_n}$.

Figure 2:
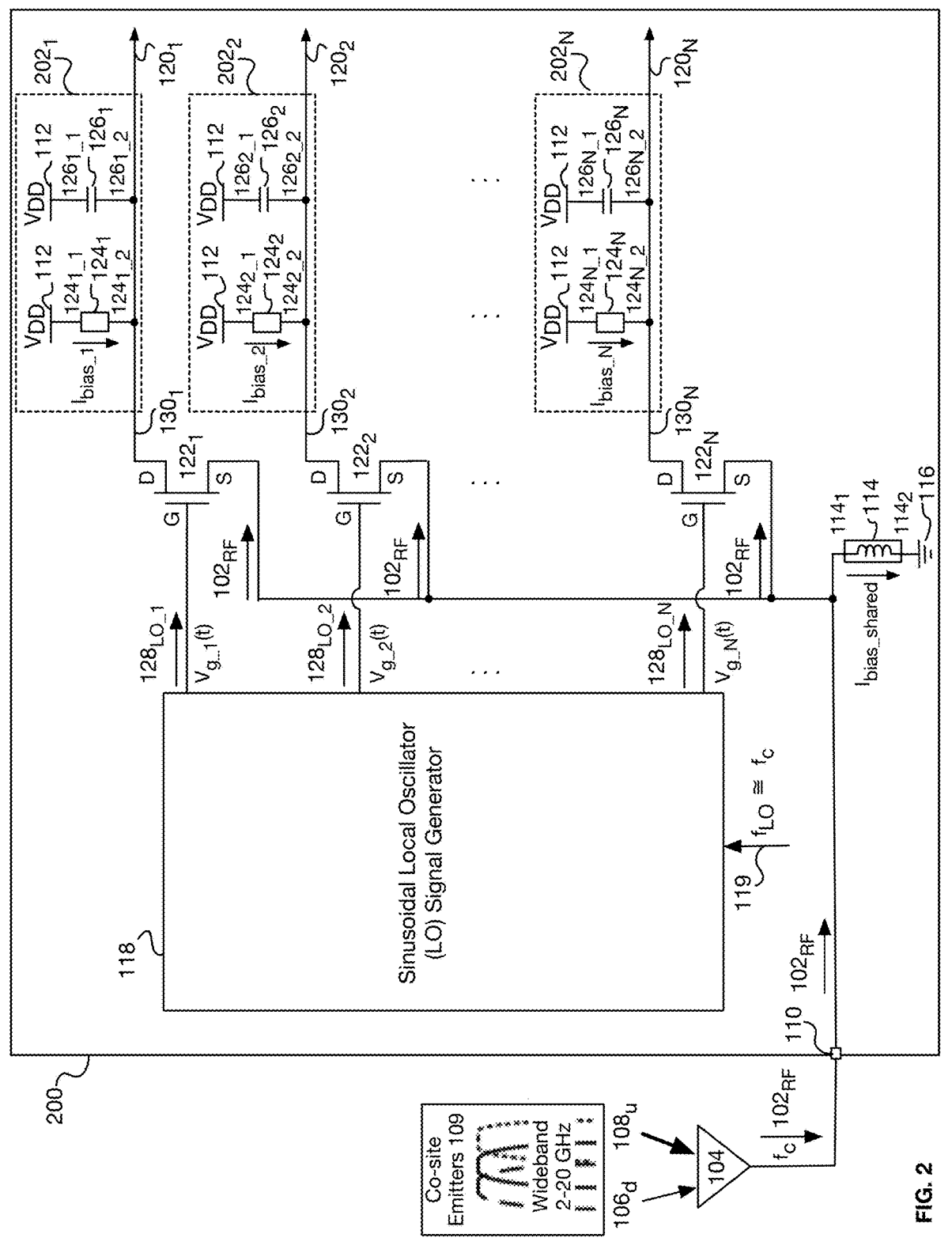
FIG. 2 is a diagram illustrating the receiver circuit of FIG. 1 having the load impedance and the filter capacitor in each baseband down-conversion path configured as a low pass filter in according to an embodiment.
Figure 3:
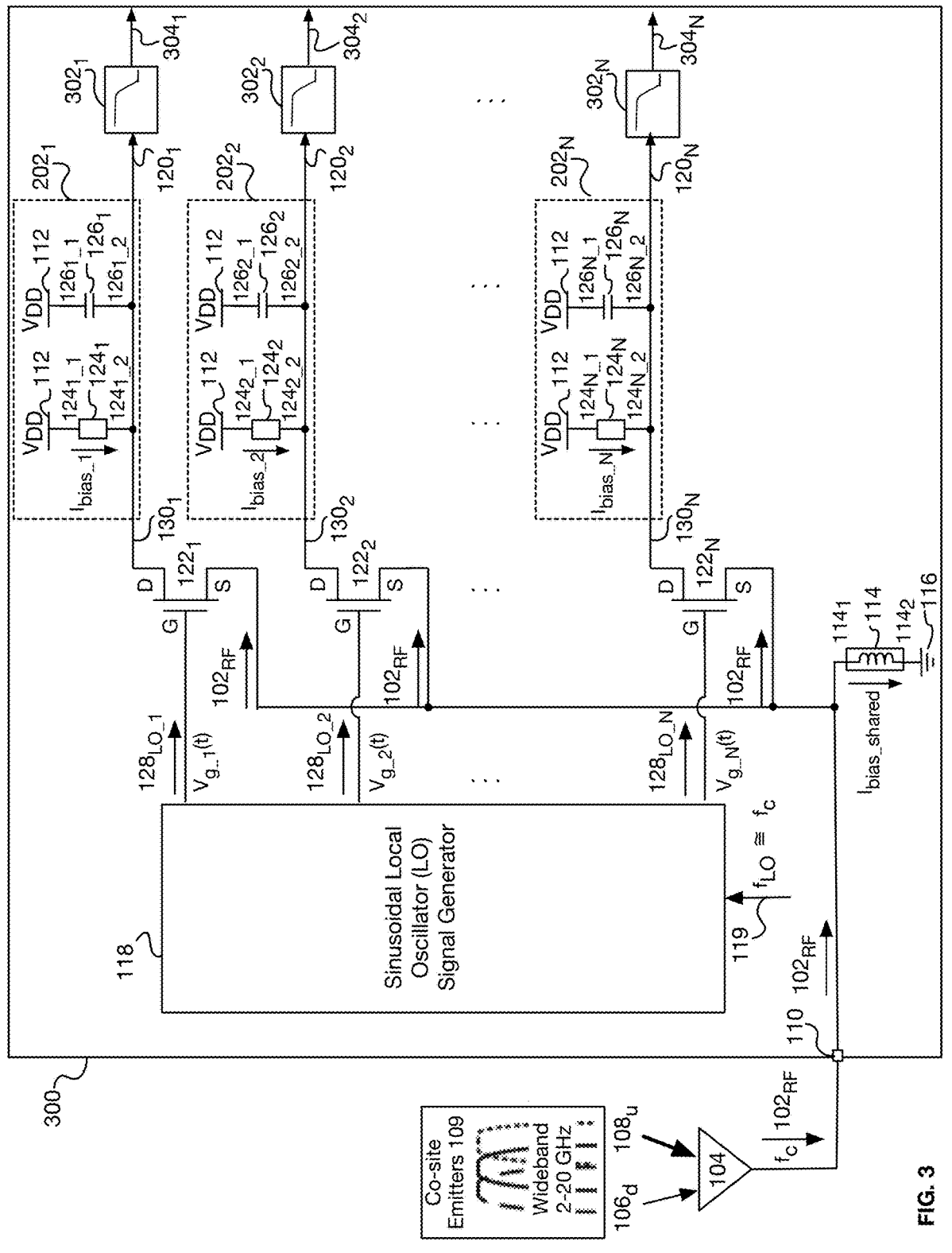
FIG. 3 is a diagram illustrating the receiver circuit of FIG. 2 having an elliptical low pass filter coupled to the low pass filter in each baseband down-conversion path according to an embodiment.
Figure 4:
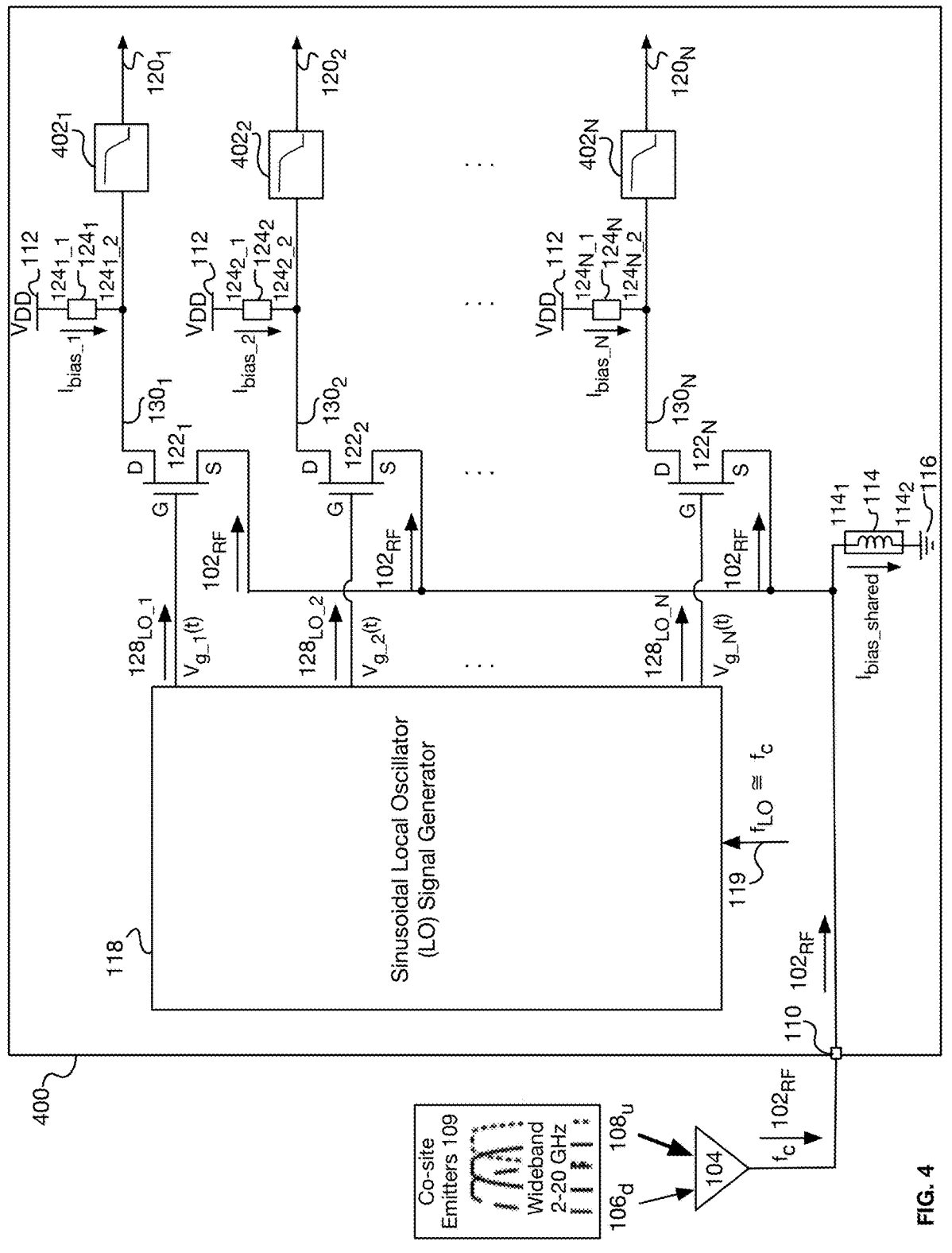
FIG. 4 is a diagram illustrating the receiver circuit of FIG. 1 having the filter capacitor configured in a low pass filter coupled to the drain of the transistor in each baseband down-conversion path according to an embodiment.

FIG. 2 illustrates an embodiment of a receiver circuit 200 that is similar to the receiver circuit 100 of FIG. 1, except that the load impedance $124_n$ and the filter capacitor $126_n$ in each baseband down-conversion path is configured as a low pass filter $202_n$ in according to an embodiment. FIG. 3 illustrates an embodiment of a receiver circuit 300 that is similar to the receiver circuit 200 of FIG. 2, except that an active elliptical low pass filter $302_n$ is coupled to the low pass filter 202, in each baseband down-conversion path according to an embodiment. FIG. 4 is a diagram illustrating an embodiment of a receiver circuit 400 that is similar to the receiver circuit of FIG. 1, except the filter capacitor $126_n$ is configured in a low pass filter $402_n$ that is coupled to the drain of the transistor $122_n$ in each baseband down-conversion path according to an embodiment.

Figure 5:
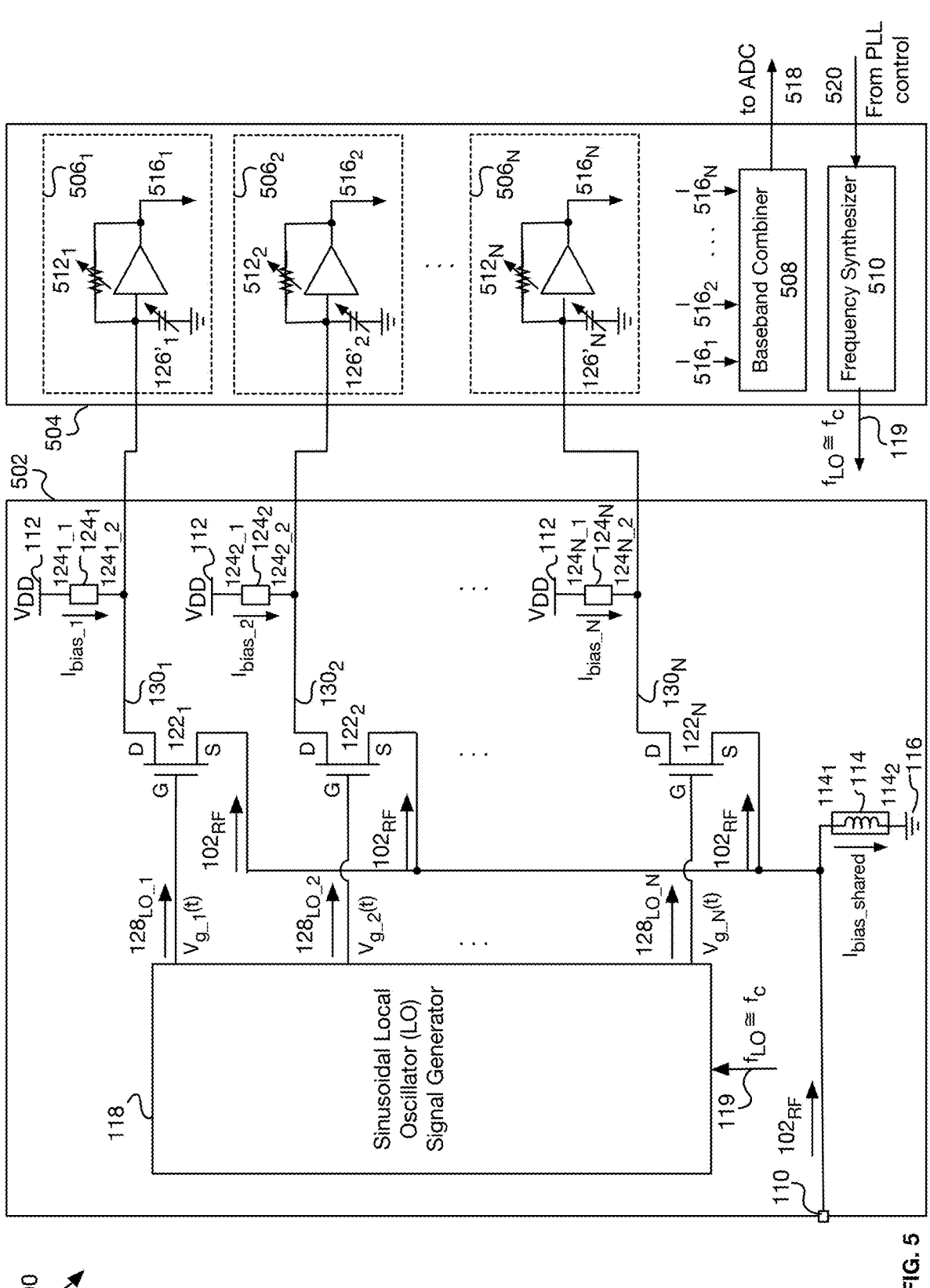
FIG. 5 is a diagram illustrating the receiver circuit of FIG. 1 having the sinusoidal local oscillator signal generator, and the transistor and load impedance in each baseband down-conversion path fabricated on a frontend MMIC according to an embodiment.

FIG. 5 is a diagram illustrating an embodiment of a receiver circuit 500 that is similar to the receiver circuit 100 of FIG. 1, except that receiver circuit 500 includes a frontend monolithic microwave integrated circuit (MMIC) 502 and a backend silicon integrated circuit 504 coupled to the frontend MMIC 402 according to an embodiment. The frontend MMIC 502 may include the sinusoidal LO signal generator 118, and the transistor 122, and the load impedance $124_n$ of each baseband down-conversion path. For example, the frontend MMIC 502 may be fabricated on a substrate comprising a gallium nitride (GaN) material, and the transistor $122_n$ in each baseband down-conversion path may be a high electron mobility transistor (HEMT).

The backend silicon IC 504 may include a plurality of amplifiers $506_{1:N}$, a baseband combiner 508, and a frequency synthesizer 510 according to various embodiments. In each baseband down-conversion path, the amplifier $506_n$ may be coupled to the drain of the transistor $122_n$ and configured as a low pass amplifier comprising the filter capacitor $126_n$ of FIG. 1 shown as a tunable filter capacitor $126'_n$ according to an embodiment. For example, the amplifier $506_n$ may be configured as a low pass amplifier that includes a tunable resistor $512_n$ coupled to the tunable filter capacitor $126'_n$ to provide a baseband down-conversion signal $516_n$ corresponding to the baseband down-conversion signal $120_n$ of FIG. 1.

The baseband combiner 508 may be configured to combine the baseband down-conversion signals $516_1$ to $516_N$ for providing a combined baseband signal 518 to an analog to digital converter (ADC) that converts the combined baseband signal 518 to a digital signal for signal processing applications. The frequency synthesizer 510 may be configured by a control signal 520 from a phased-locked loop (PLL) control system to provide the single-ended sinusoidal voltage signal 119 having the center frequency $f_c$ of the RF input signal $102_{RF}$ according to an embodiment.

Figure 6:
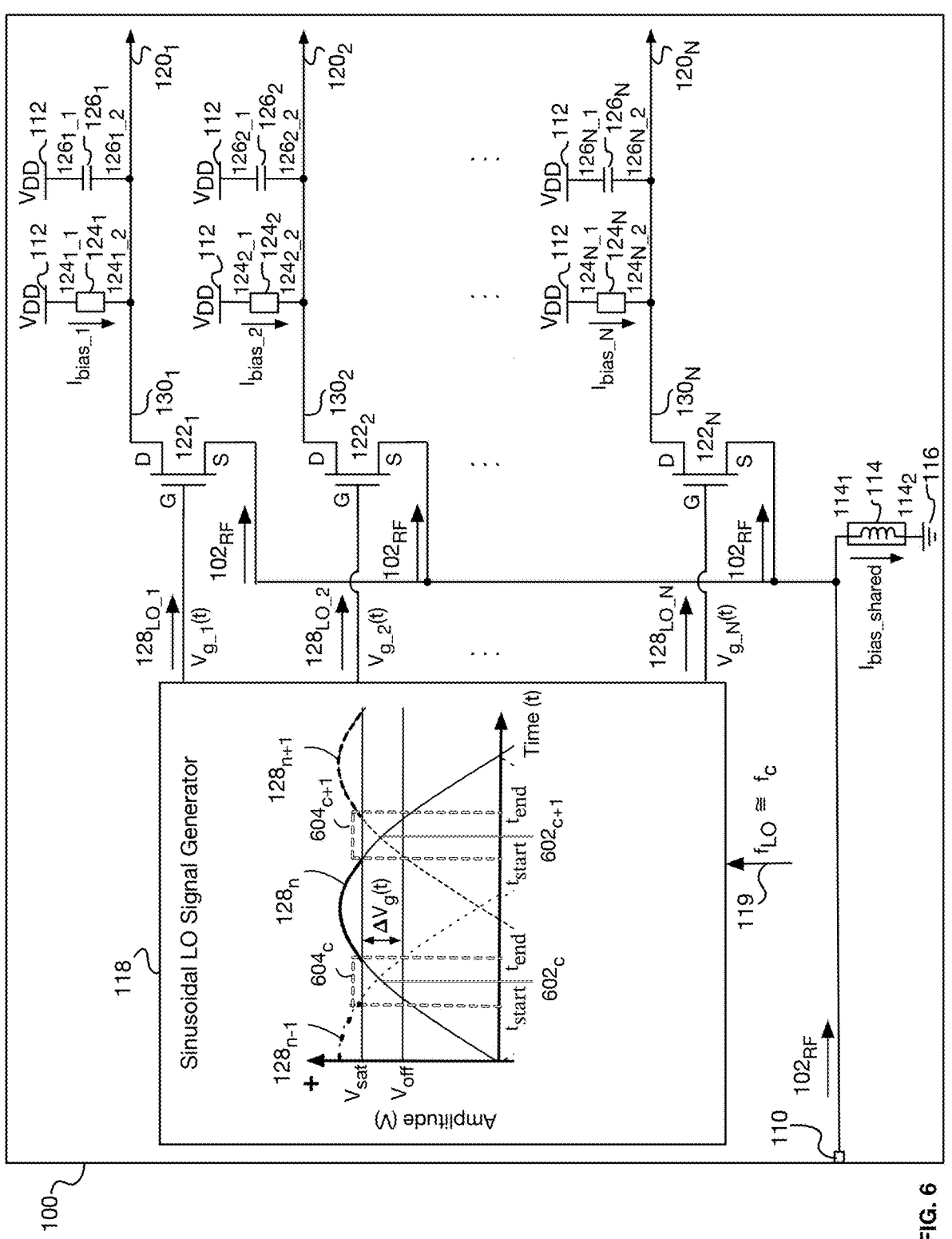
FIG. 6 is a diagram illustrating bias current steering and sinusoidal voltage gate drivers for transistor commutation in the receiver circuit of FIG. 1 according to an embodiment.

FIG. 6 illustrates bias current steering and sinusoidal voltage gate drivers for transistor commutation in the receiver circuit 100 of FIG. 1 according to an embodiment. The plurality of phase-shifted sinusoidal voltage signals $128_{1:N}$ comprises a plurality of periodic sinusoidal intersections $602_{1:C}$ that determines a plurality of periodic commutation transition periods $604_{1:C}$. Each sinusoidal intersection $602_c$ determines a commutation transition period $604_c$ of switching between the transistor $122_n$ in the current baseband down-conversion path to the transistor $122_{n+1}$ in the next baseband down-conversion path. The duration of the commutation transition period $604_c$ may be configured to control noise figure and performance characteristics of the receiver circuit 100 according to embodiments.

For example, the commutation transition period $604_c$ includes a transition start time $t_{start}$ and a transition end time tend. During the commutation transition period $604_c$, the transistor $122_n$ in the current baseband down-conversion path and the transistor $122_{n+1}$ in the next baseband down-conversion path each operate in a triode mode. By the transition end time tend:

1. The transistor $122_n$ in the current baseband down-conversion path switches from operating in the triode mode to a cut-off mode when the time varying amplitude $V_{g\_n}(t)$ of the phase-shifted sinusoidal voltage signals $128_{LO\_n}$ is below a cut-off mode voltage threshold $V_{off}$.

2. The transistor $122_{n+1}$ in the next baseband down-conversion path switches from operating in the triode mode to a saturation mode when the phase-shifted sinusoidal voltage signals $128_{LO\_n+1}$ is above a saturation mode voltage threshold $V_{sat}$.

The difference between the saturation mode voltage threshold $V_{sat}$ and the cut-off mode voltage threshold $V_{off}$ determines the duration of the commutation transition period $604_c$ according to an embodiment. Also, the difference between the saturation mode voltage threshold $V_{sat}$ and the cut-off mode voltage threshold $V_{off}$ may be configured to steer substantially all of the shared bias current $I_{bias-shared}$ to the transistor $122_{n+1}$ in the next baseband down-conversion path by the end of the transition time tend. Accordingly, substantially all of the shared bias current $I_{bias}$ shared is steered as a bias current $I_{bias\_n+1}$ to the transistor $122_{n+1}$ in the next baseband down-conversion path when the time varying amplitude $V_{g\_n+1}(t)$ of the phase-shifted sinusoidal voltage signals $128_{LO\_n+1}$ associated with the gate of the transistor $122_{n+1}$ is above the saturation mode voltage threshold $V_{sat}$.

Figure 7A:
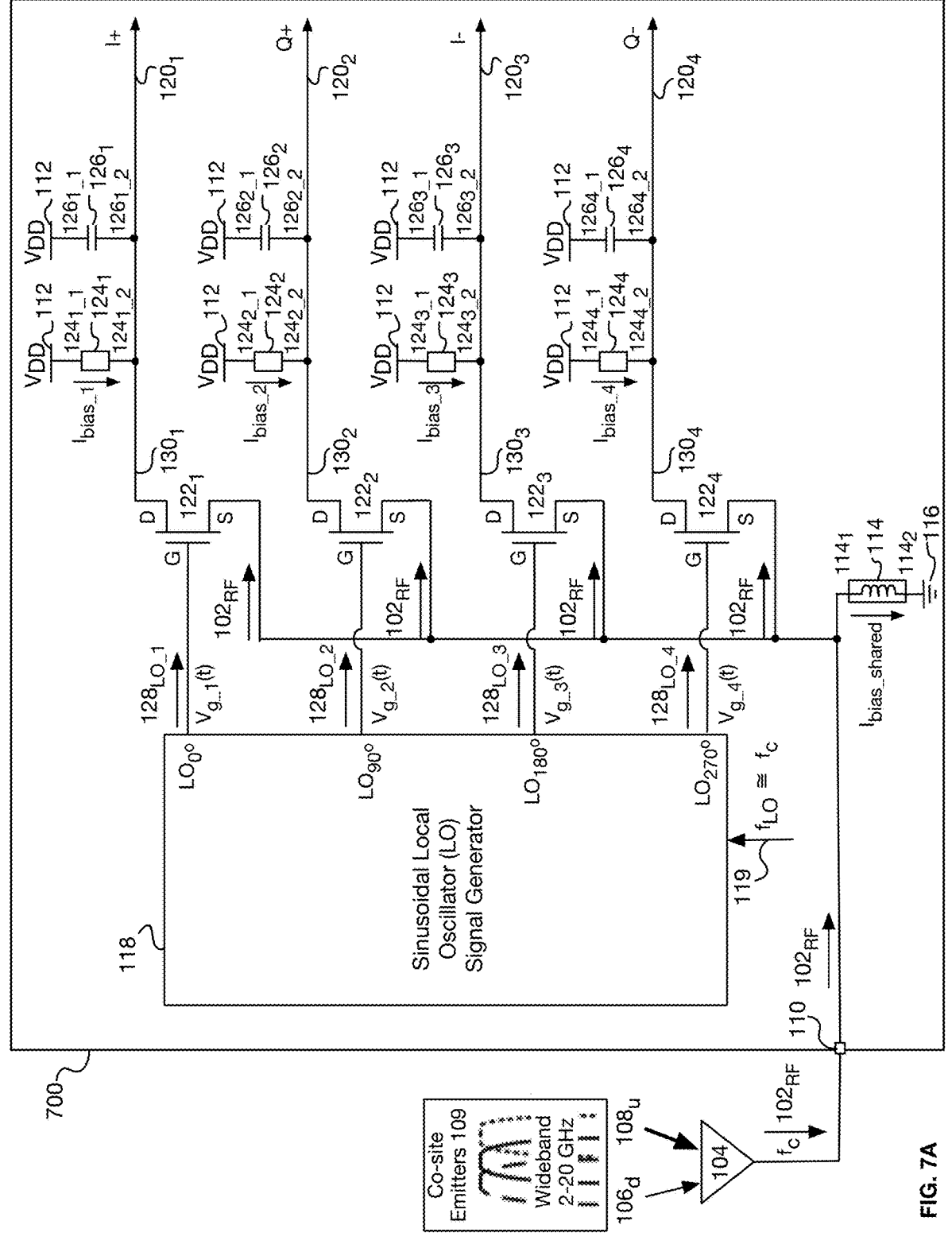
FIGS. 7A-7B are diagrams illustrating transistor commutation between quadrature baseband down-conversion paths in the receiver circuit of FIG. 6 according to an embodiment.
Figure 7B:
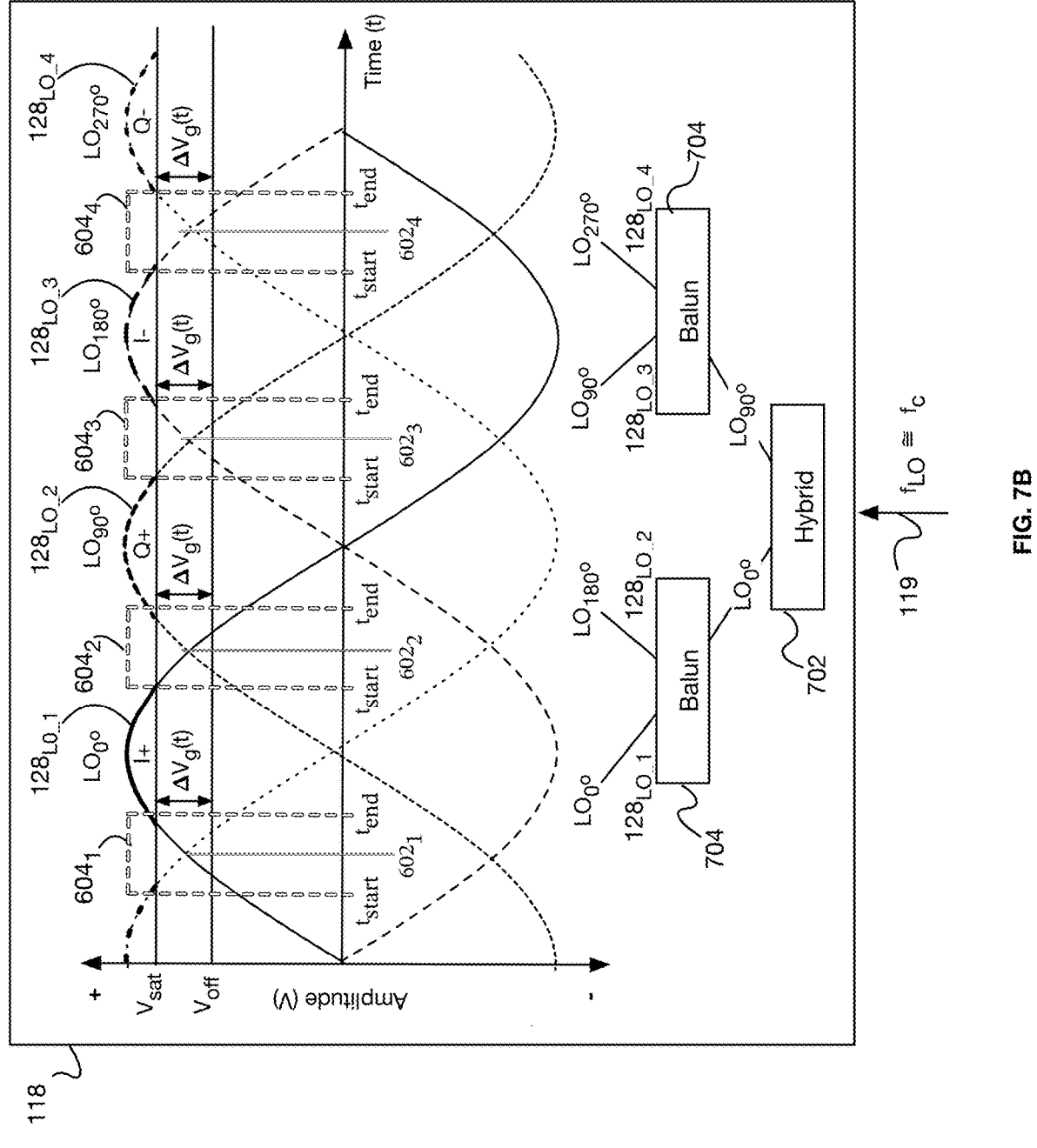

FIG. 7A is a diagram illustrating an embodiment of a receiver circuit 700 that is similar to the receiver circuit 100 of FIG. 1, except that receiver circuit 700 is configured for N=4 baseband down-conversion paths and the sinusoidal LO signal generator 118 is configured to split the single-ended sinusoidal voltage signal 119 into N=4 phase-shifted sinusoidal voltage signals $128_{LO\_1}$ to $128_{LO\_4}$. The baseband down-conversion paths (N=1 to N=4) generate quadrature baseband down-conversion signals $120_1$ (I+), $120_2$ (Q+), $120_3$ (I−), and $120_4$ (Q−) in response to the shared bias current $I_{bias\_shared}$, the RF input signal $102_{RF}$, and the phase-shifted sinusoidal voltage signals $128_{LO\_1}$ (phase angle θ=0°), $128_{LO\_2}$ (θ=90°), $128_{LO\_3}$ (θ=180°), and $128_{LO\_4}$ (θ=270°). FIG. 7B illustrates the periodic sinusoidal intersections $602_{1:4}$ that determine the periodic commutation transition periods $604_{1:4}$ in the sinusoidal LO signal generator 118 of FIG. 7A. The sinusoidal LO signal generator 118 of FIG. 7A may be configured with wideband quadrature hybrid 702 and subsequent baluns 704 to split the single-ended sinusoidal voltage signal 119 into the phase-shifted sinusoidal voltage signals $128_{LO\_1}$ to $128_{LO\_4}$ that are phase and amplitude balanced signals.

FIG. 8 illustrates a method 800 of converting a radio frequency (RF) input signal to a baseband signal according to an embodiment. The method 800 includes a block 802 that receives a radio frequency (RF) input signal having a center frequency. Block 804 generates a plurality of sinusoidal voltage signals having a signal frequency that is substantially the same as a center frequency of the RF input signal. Block 806 provides a shared bias current. Block 808 associates a plurality of transistors with the plurality of sinusoidal voltage signals, the RF input signal, and the shared bias current. Block 810 cyclically steers the shared bias current to configure one of the plurality of transistors to operate in a saturation mode in response to a time varying amplitude of one of the plurality of sinusoidal voltage signals that drives a gate of the one of the plurality of transistors. Block 812 mixes the RF input signal and the sinusoidal voltage signal associated with the one of the plurality of transistors configured in the saturation mode to generate a mixed signal. The mixed signal has a phase angle that is at least partially determined by the one of the plurality of sinusoidal voltage signals that drives the gate of the one of the plurality of transistors. Block 814 filters the mixed signal to provide the baseband signal having the phase angle of the mixed signal. The method may include using a low pass filter for filtering the mixed signal to provide a baseband signal having a phase angle related to the phase of the mixed signal.

According to embodiments, the method may include (a) providing a single-ended sinusoidal voltage signal having the signal frequency that is substantially the same as the center frequency, and (b) tuning a sinusoidal local oscillator to generate the plurality sinusoidal voltage signals in response to the single-ended sinusoidal voltage signal. Also, the method may include steering substantially all of the shared bias current (a) to the one of the plurality of transistors when an instantaneous gate voltage from the time varying amplitude of the one of the plurality of sinusoidal voltage signals is above a saturation mode voltage threshold $V_{sat}$; and (ii) away from another one of the plurality of transistors when an instantaneous gate voltage from the time varying amplitude of another one of the plurality of sinu-soidal voltage signals associated with the gate of the other one of the plurality of transistor is below a cut-off mode voltage threshold $V_{off}$.

FIG. 9A is a diagram illustrating a receiver circuit 900 that is similar to the receiver circuit 500 of FIG. 1, except that receiver circuit 900 is configured with quadrature baseband down-conversion and elliptic low pass filters according to an embodiment. The receiver circuit 900 may be an active GaN N-path filter receiver that includes a high-dynamic-range receiver front-end shown as a GaN MMIC. The GaN MMIC may include two circuit blocks: 1) a wideband quadrature signal generation (IQ LO Generation) circuit block with sufficient amplitude and substantially equal phase balance to approximate hard switching between the N-path mixer switches and 2) an active N-path mixer core circuit block.

Since the N-path filter up-converts a low pass filter on the baseband, an elliptic filter load may be coupled to achieve a 30 dB/octave roll-off ensuring that at 1× bandwidth offset from center frequency of the filter, out-of-band signals are suppressed by >30 dB, according to an embodiment. The filter response 902 is the simulated down-converted power with an elliptic low pass filter load, and the filter response 904 is the simulated down-converted power with an RC low pass filter load. The receiver circuit 900 includes a silicon baseband amplifier for which P1 dB is greater than-10 dB (20 dB maximum suppressed by 30 dB out-of-band) and poly-phase quadrature recombining delivers suppressed out-of band and amplified in-band signals within the dynamic range of the baseband ADC, according to an embodiment.

In an embodiment of the active N-path mixer/filter core, the active N-path mixer core may be designed for 2-40 GHz operation and comprised of 4 devices such as HEMT switches with all device source terminals tied to the antenna port with a 2 nH DC biasing inductor shunt to ground. The active N-path mixers may be configured to operate with quadrature-phased sinusoids whereby bias current is cyclically steered between each transistor in the 4 baseband down-conversion paths when $\Delta V_g$ is sufficiently large to prevent current from leaking into transistors in adjacent paths due to sinusoidal overlap. Also, the GaN HEMTs may be negatively biased and fully on when gate signal is ~ 0V, and gate signals may be biased to ~−1V with 2V $V_{PP}$. The active mixer core may be locally loaded with a load characterized by a resistance and a capacitance (RC) for DC biasing and local high-frequency harmonic shunting according to an embodiment. Resistive loads on the order of 1 kΩ are sufficient to minimize noise contribution and impedance impact; thus capacitance is selected to set the desired corner frequency. At baseband, the active mixer core may be loaded with a $5^{th}$ order LC passive elliptic filter generated and optimized with iFilter in Advanced Wave Research (AWR) software. The active elliptic filter loads, as well as low pass filters with reduced roll-off, may be used, depending on design application and requirements. For high linearity, 6V drain bias may be used.

Figure 9B:
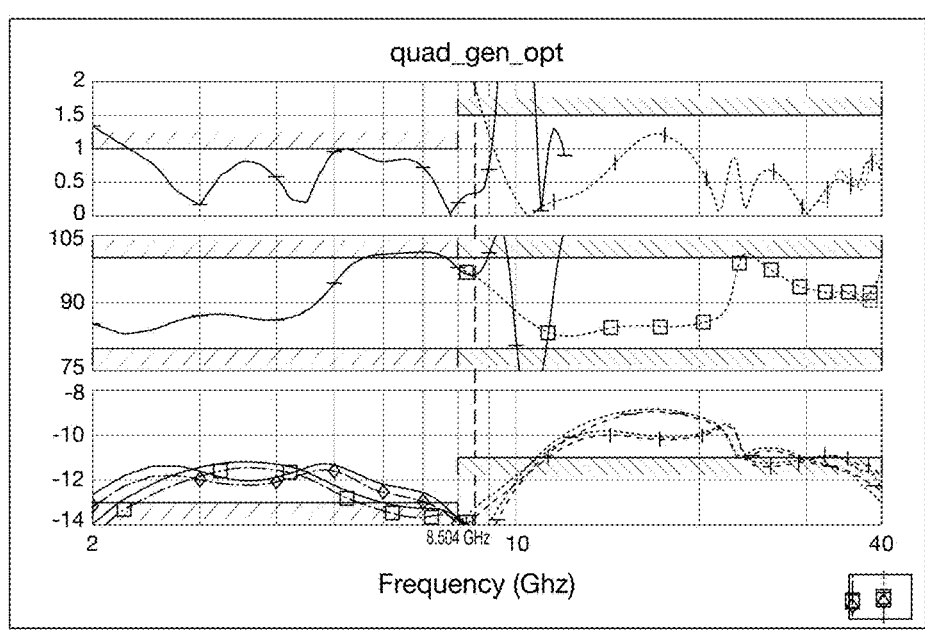
FIGS. 9B-9F show simulation data and circuit layout for an embodiment of the receiver circuit of FIG. 9A.
Figure 9C:
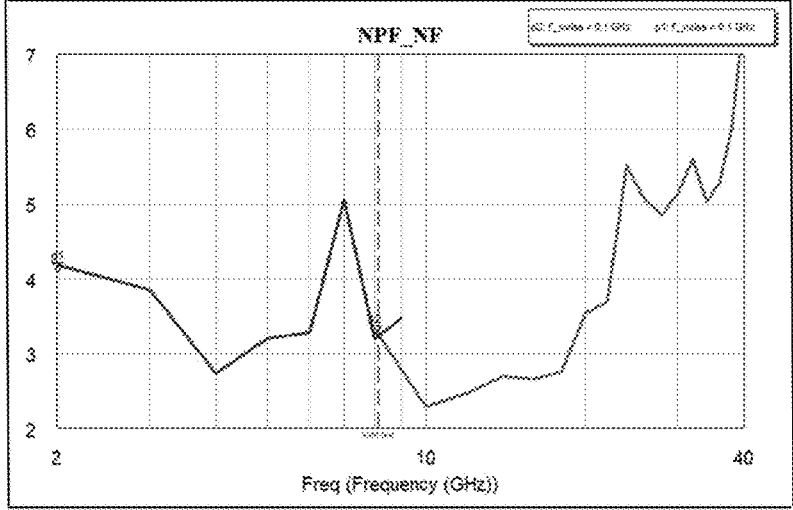
Figure 9D:
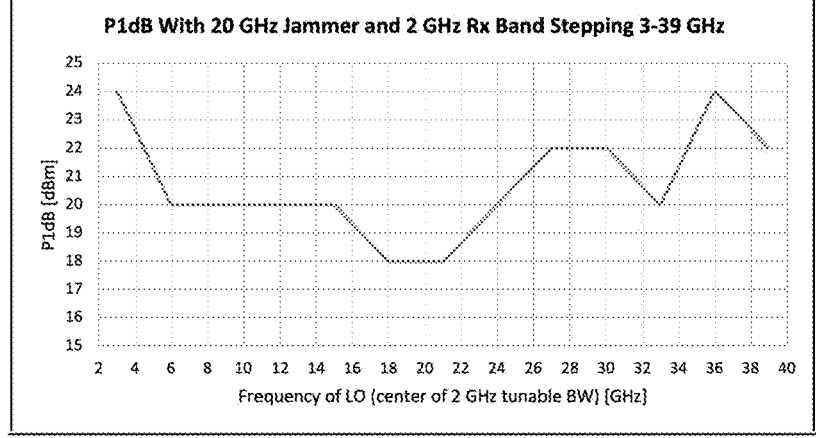
Figure 10:
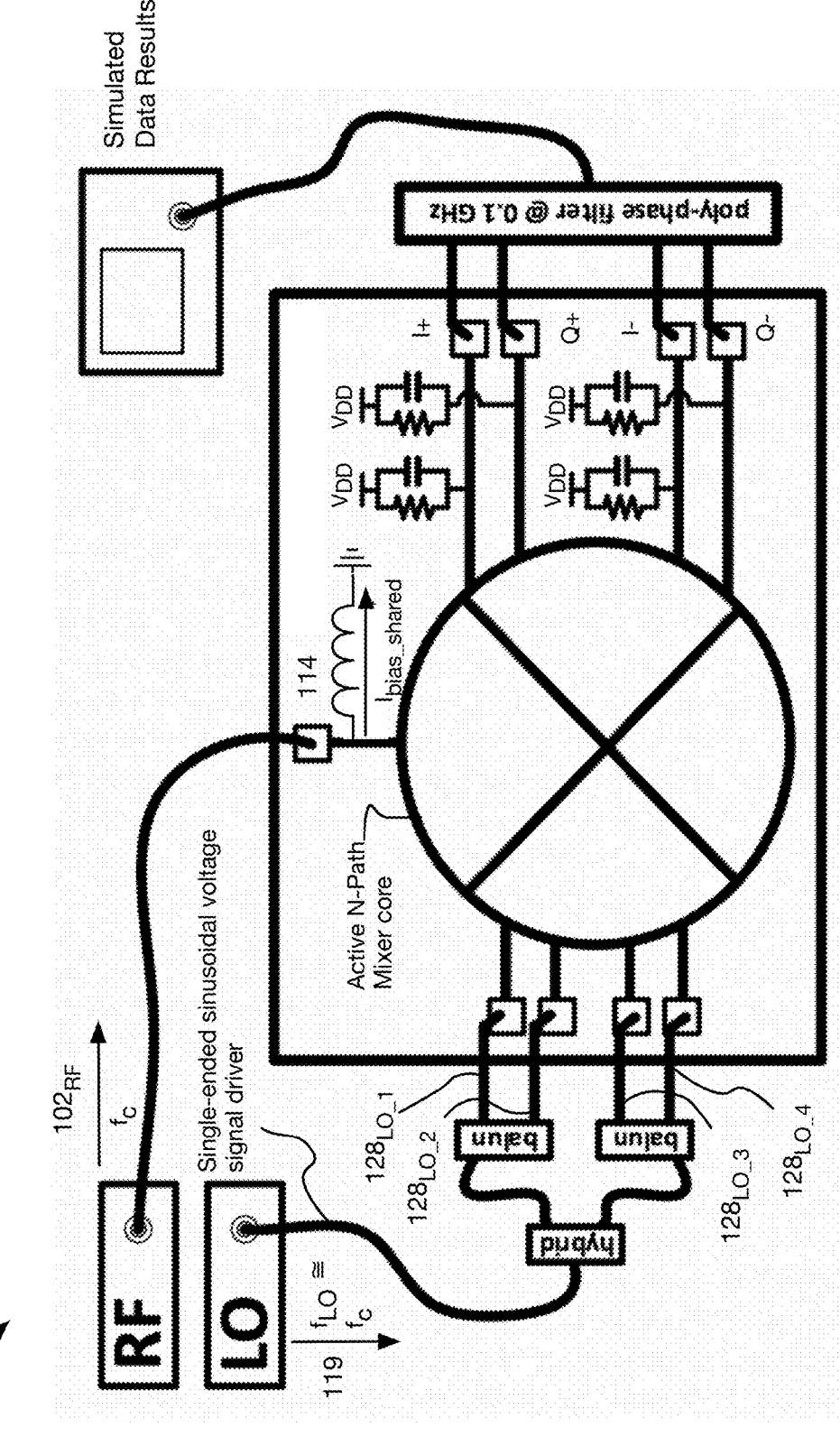
FIG. 10 is a block diagram illustrating a simulation test setup for quadrature configuration of the receiver circuit of FIG. 7A according to an embodiment.

In FIG. 9B, simulation of switched-transmission line quadrature generation from 2-40 GHz shows amplitude error between quadrature-phased gate drive signals is below 1.5 dB and 10° across the full tuning range with switch selecting between 2-8.5 GHz and 8.5-40 GHz. In FIG. 9C, simulation of switched-transmission line quadrature generation driving active mixer core and elliptic load achieves <6 dB up to 39 GHz and rises to ~ 7 dB due to loss in LO generation path as well as increased phase error between I/Q. The LO power can be increased to compensate loss; however, there is no compensation for phase errors. In FIG. 9D, simulation of the receiver circuit 900 with 20 GHz jammer and LO swept from 3-39 GHz shows >20 dBm P1 dB when jammer lies sufficiently out-of-band relative to the tunable passband.

Figure 9E:
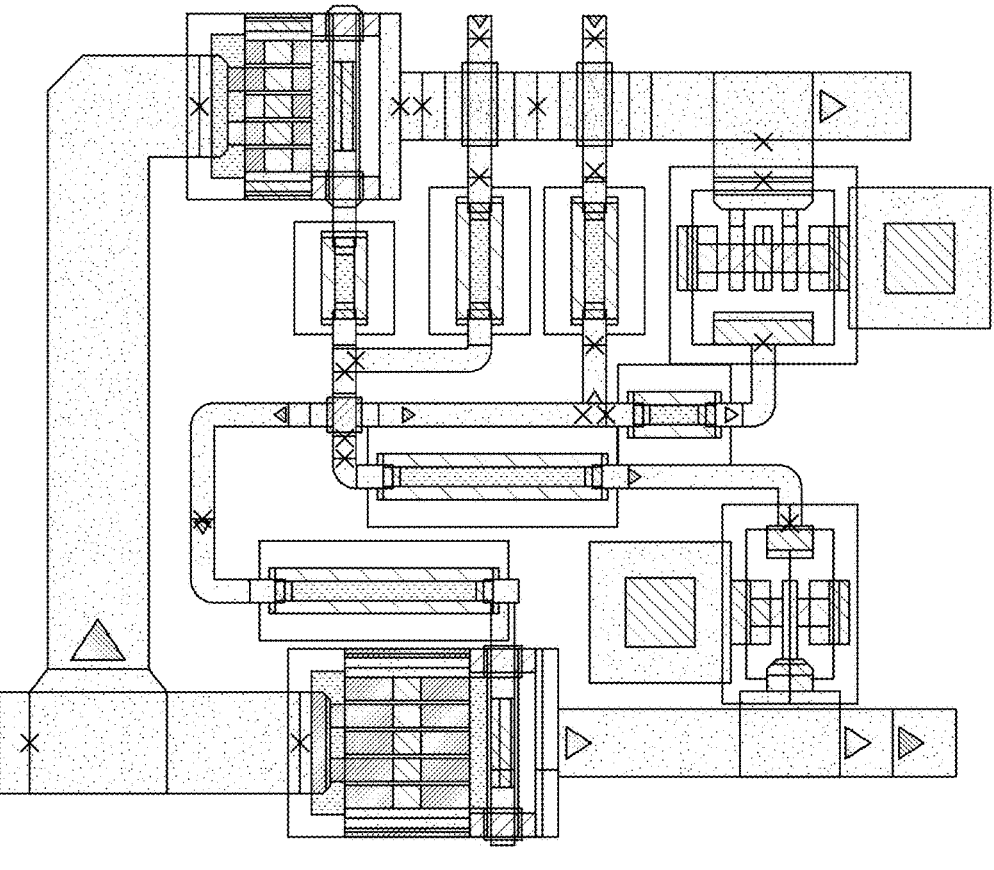
Figure 9F:
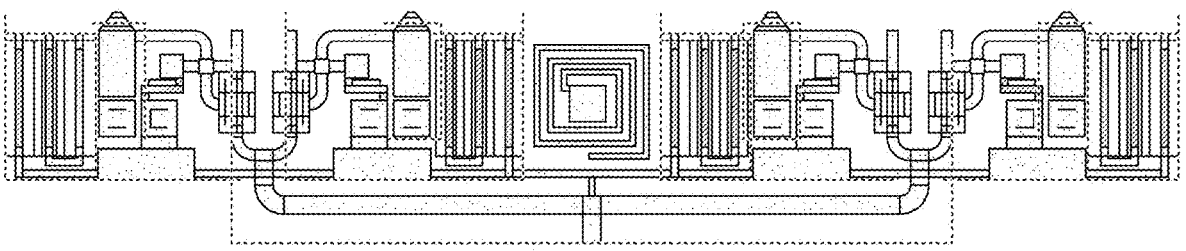

FIG. 9E shows a switch layout with 2-8 GHz and 8-40 GHz optimized switches, and FIG. 9F shows an active N-path mixer core layout with RC gate load for stability according to embodiments of the receiver circuit 900 in FIG. 9A. Based on simulations which yield a 1 dB degradation in noise figure, a maximum phase error of 10° and amplitude error of 1.5 dB were determined to be requirements for amplitude and phase balance according to embodiments. While conventional filter banks may switch between filters covering various ranges from 2-18 GHz, a similar switch approach in the LO path (instead of the RF path) can cover 2 ranges from 2-8 GHz and from 8-40 GHz to generate sufficiently balanced I and Q across the full frequency range. The switch layout comprised of GaN switches with minimum routing lengths on the 8-40 GHz path is shown in FIG. 9E. While 1 dB loss due to switches in the RF path is a direct 1 dB degradation to receiver sensitivity, a 1 dB loss in the LO path leads to <0.1 dB degradation in the overall system noise figure. In addition to the switch, coupled-line-couplers for both quadrature generation and baluns for 1 dB amplitude imbalance across 4-5 octaves were designed and nested for compact layout.

FIG. 10 is a block diagram illustrating an embodiment of a receiver circuit 1000 that is configured as a quadrature receiver circuit having an active N-Path mixer core similar to the active N-path mixer core with transistors $122_1$ to $122_4$ in the receiver circuit 700 of FIG. 7A. The receiver circuit 1000 utilizes the inherent high breakdown, high velocity saturation, and high fT/fmax of 40 nm mm-wave GaN, to perform linear down-conversion achieving in-band 1 dB compression of 19 dBm according to an embodiment. Due to the active N-path mixer's impedance transparency, out-of-band jamming power may be suppressed at the RF port, increasing the out-of-band 1 dB compression point to >25 dBm delivering <0.1 dB noise figure (NF) degradation with a 10 dBm emitter out-of-band and <1.0 dB NF degradation with a 10 dBm emitter in-band. NF varies from 4-10 dB across 2-20 GHz due to variations in the amplitude and phase imbalance of the quadrature-phased gate drive sinusoids generated off-chip by a quadrature coupler and baluns driven by a 16 dBm single-ended LO input. Unlike utilizing a resonant LO buffer and a bandwidth-limiting transformer in the RF path to mitigate overlap-induced loss, the architecture embodiment of FIG. 1000 utilizes an active mixer core for robust operation of 4 parallel current-biased GaN HEMTs in a current-steering N-path down-conversion architecture. Examples of the active mixer core embodiment may consume 25 mW with a 2.5V drain bias and achieve >10 dB more blocking dynamic range across 9.3× fractional bandwidth compared to other GaN N-path down-converters.

For simulation and measurements in an embodiment of receiver circuit 1000, the active mixer core was configured in a 40 nm GaN-on-SiC process with fT/fmax of 150/350 GHz. While other larger device technologies are optimized for power delivery, a 40 nm mm-wave GaN may be optimized for low noise boosting 0.6 dB NFmin at 20 GHz. Switch devices are sized 6×37.5 μm for optimal performance across the selected decade of frequency coverage and all gates are loaded with a series RC loads shunted to ground to ensure stability for such high-gain devices. The DC choke inductor is sized to optimize the trade-off between self-resonant frequency (SRF) and loss at low frequencies to minimize performance degradations across a decade of frequency coverage due to the additional inductor. The baseband load impedance is a simple RC circuit where tantalum nitride (TaN) resistors provide in-band matching and large metal-insulator-metal (MIM) capacitors set the single-pole roll-off frequency to 200 MHz with minimal variation to process tolerances. Finally, the poly-phase filter set for quadrature-combining at 100 MHz may be implemented with discrete resistors and capacitors that have values selected to minimize loss and loading to the target baseband impedance.

Figure 13A:
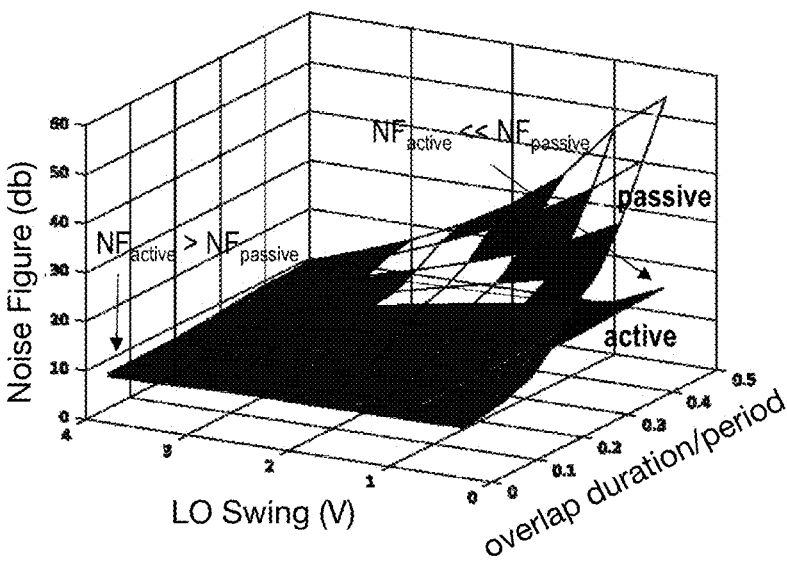
Figure 13B:
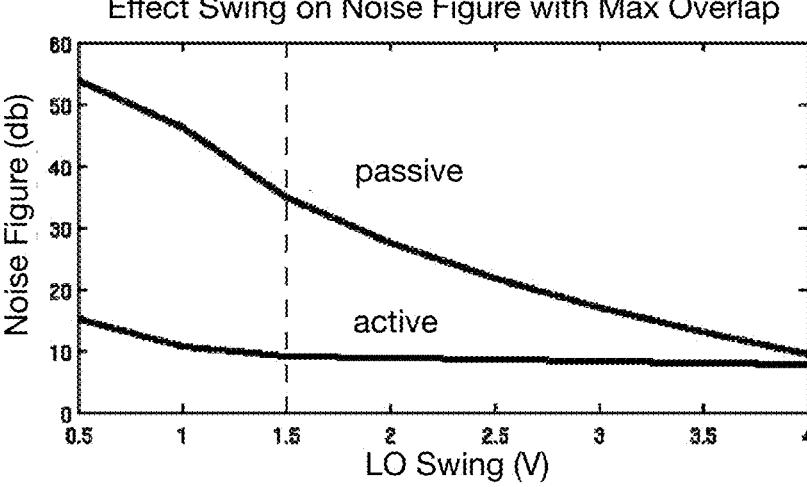

FIGS. 11A-13B show mixer architecture and noise performance data from (a) an active mixer architecture illustrated in FIGS. 11A-11C as embodiments in the receiver circuit 1000 of FIG. 10 and (b) a conventional passive mixer architecture in FIGS. 12A-12C, with data comparison of their respective noise figure performance in FIGS. 13A-13B. In N-path mixers, a requirement for achieving the desired dynamic range is minimization of $R_{on}$ of the mixer core devices as discussed in C. Andrews and A. C. Molnar, "A Passive Mixer-First Receiver With Digitally Controlled and Widely Tunable RF Interface," in IEEE JSSC, vol. 45, no. 12, pp. 2696-278 December 2010. When Vgs>Vth $R_{on}$ is large relative to $R_S$, the source/port resistance, which would limit linearity. Additionally, it is known that conventional passive mixers with N switches sharing a common source node as the RF port behave like N parallel single pole single throw (SPST) switches, which if "on" simultaneously would cause charge sharing and loss between adjacent paths. Thus, conventional 4-phase passive mixer architectures require generation of quadrature-phased 25% duty-cycle non-overlapping maximum-allowable-swing pulse trains.

The current steering with a HEMT active mixer architecture illustrated in the receiver circuit 1000 of FIG. 10 relaxes the non-overlapping requirement of prior art N-path passive mixers. To quantify the effect of LO overlap and LO swing on the active mixer architecture in the receiver circuit 1000 of FIG. 10, FIGS. 13A-13B compare the noise figure of the active mixer architecture in FIG. 11A-11C to the passive mixer architecture in FIGS. 12A-12C.

A challenge of implementing 4-phase N-path passive mixer architectures (FIGS. 12A-12C) is generating the required quadrature phased 25% duty cycle non-overlapping pulses. Referring to FIGS. 13A and 13B, comparison of noise performance for (a) active mixer architecture embodiment in FIGS. 11A-11C and (b) conventional passive mixer architecture in FIGS. 12A-12C demonstrates LO requirement relaxation for the active mixer (FIGS. 11A-11C). FIG. 13A plots noise figure of both architectures on the z-axis where the y-axis sweeps LO swing in volts and the x-axis sweeps the duration of overlap relative to the period with max 0.5 (representative of 50% duty-cycle triangle waves and rise/fall time equivalent to half of the period) and min 0.05 (representative of 25% duty-cycle non-overlapping pulses and rise/fall time equivalent to 5% of the period). FIG. 13B takes the slice of FIG. 13A at the worst-case overlap (x=0.5) and projects noise figure onto the y-axis and LO swing on the x-axis.

Simulated noise figure while sweeping both the duration of overlap and the total LO swing for the active mixer and the passive mixer is shown in FIG. 13A. For the case of maximal overlap in FIG. 13B, which is representative of sinusoidal drive, the effect of LO swing beyond 1.5V is nearly negligible for the active mixer architecture (FIGS. 11A-11C). Also, at the same 1.5V swing the conventional passive architecture (FIGS. 12A-12C) noise is nearly 25 dB worse. To achieve comparable noise performance as the active architecture (FIGS. 11A-11C) with 1.5V LO swing, the conventional passive architecture (FIGS. 12A-12C) would require >4V which is equivalent to approximately 10 dB greater LO drive power.

Accordingly, the active N-path mixer architecture in FIGS. 11A-11C eliminates the requirement for 25% duty cycle pulse in the conventional passive mixture in FIGS. 12A-12C, such that quadrature phased sinusoids are sufficient to hard-switch the active mixer switches (FIGS. 11A-11C) without requiring non-overlapping pulses. Since the quadrature balanced sinusoids in FIG. 11A are much easier to generate across a large frequency range compared to the non-overlapping pulses in FIG. 12A, and significantly less power can be consumed to drive such active mixer switches shown in FIG. 11B, the active mixer architecture (FIGS. 11A-11C) provides a method for high dynamic range receivers which can sample a pre-determined bandwidth within the 2-40 GHz range and down-convert to baseband.

FIGS. 11C and 12C show idealized model diagrams of the respective circuit schematics in FIGS. 11B and 12B. FIG. 11C shows the idealized model diagram of the active mixer architecture functioning like one single pole four throw switch (SP4T) for commutating between transistors. FIG. 12C shows the idealized model diagram the of the conventional passive mixer architecture functioning like four parallel single pole single throw (SPST) switches, which if "on" simultaneously would cause charge sharing and loss between adjacent paths. The thick lines represent conduction paths corresponding to transistor switches.

A property of N-path mixers/filters is impedance transparency whereby low pass filters on the I/Q baseband outputs are up-converted to band-pass filters at the RF port, Vx. Since I/Q baseband outputs sample the RF current in quadrature, and switches driven by the LO pulses re-upconvert the I/Q baseband signals back to Vx whenever the corresponding switch is closed, baseband impedance controls the amplitude and phase of the re-upconverted signal, Vx. Due to sampling, the impedance presented to the input port by the N-path mixer and low pass filter load is ~0.2*R. Thus, wideband matching can be achieved as long as the gate drive pulse can be generated. Thus, conventional N-path mixers have frequency range limited by matching, and also by gate drive signal generation. At mm-wave frequencies, the generation of such pulses is non-trivial. Accordingly, the current steering with a HEMT active mixer architecture illustrated in the receiver circuit 1000 of FIG. 10 relaxes the non-overlapping requirement of conventional passive N-path mixers for mm-wave frequencies.

Figure 14A:
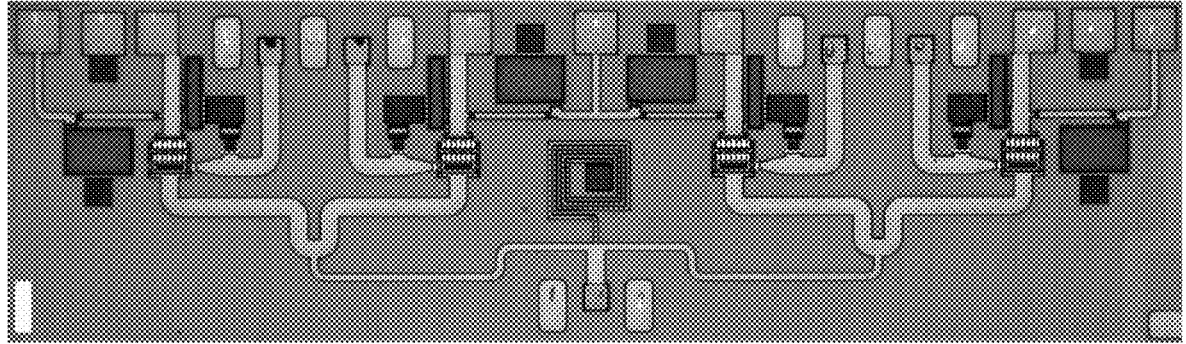
FIGS. 14A-14D show a photo of a die sample and simulated v. measured performance data for the active N-path mixer/filter in the receiver circuit of FIG. 10.
Figure 14B:
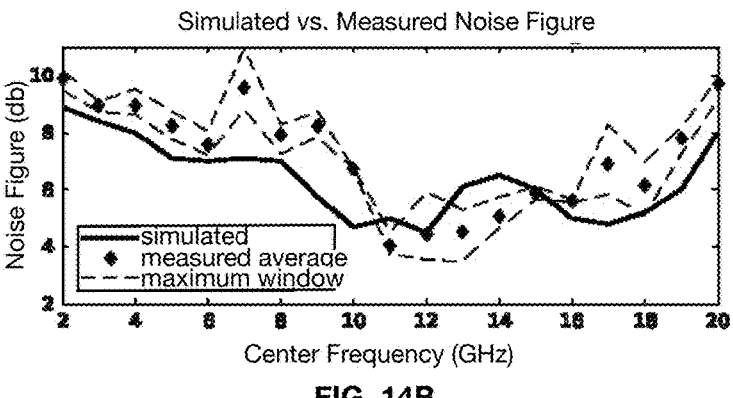
Figure 14C:
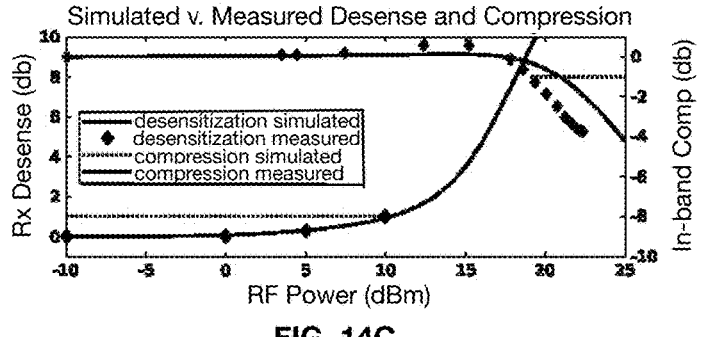
Figure 14D:
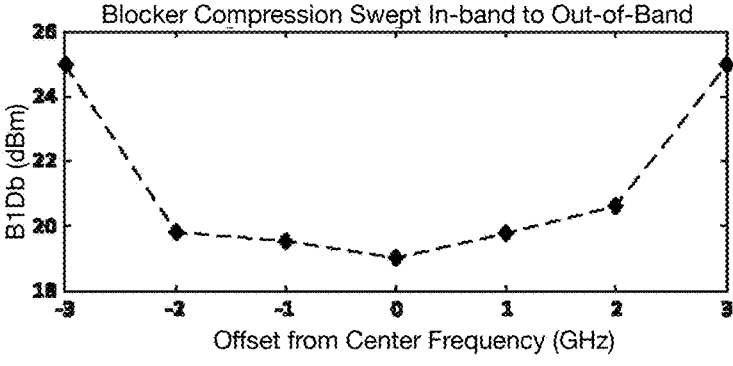

FIGS. 14A-14D show sample die and simulation data according to an embodiment of the receiver circuit 1000 of FIG. 10A. On-wafer measurements and performance benchmarking were completed with custom wedge probe assemblies on five separate die from the same lot. FIG. 14A shows a sample die photo with an active area of 2.5 mm×0.5 mm. The RF, LO, and baseband pad locations may be determined by ease of interface with both an ultrawideband LO generation block and baseband electronics, and capture losses associated with layout decisions made based on application interfaces. FIGS. 14B-14D show measured performance benchmarking: FIG. 14B is the simulated vs. measured noise figure (NF) with max/min envelope, FIG. 14C is simulated vs. measured NF degradation at 1 dB compression at 12 GHz, and FIG. 14D shows the measured and simulated B1 dB are close to each other when swept from −3→+3 GHz with in-band P1 dB at 0 GHz. As shown in FIG. 14B, 16 dBm LO power was delivered into an off-chip wideband quadrature hybrid and subsequent baluns to ground-signal-ground-signal-ground radio frequency (GSGSG RF) probe pairs. Losses in the LO path are not de-embedded and are reduced when quadrature generation is fully-integrated. The RF input is delivered via a ground-signal-ground radio frequency (GSG RF) probe and losses in the RF path are de-embedded to the probe tips for accurate reporting. Baseband outputs at 100 MHz are read from 300 MHz DC probes with resistors and capacitors forming the poly-phase filter soldered onto a custom probe assembly. Differential outputs of the poly-phase filter are combined by a balun and measurements at baseband are de-embedded to the probe tips and read from a spectrum analyzer. Nominal gain is 8 dB.

FIG. 14B shows the simulated vs. measured NF with an envelope of maximum and minimum measured NF across five die at each frequency. The calculated root mean squared error (RMSE) averaged over frequency between simulation and measurements is 1.41 dB while the RMSE averaged over frequency between die measurements dropped to 0.47 dB. This is consistent with expectation that there are noise mechanisms introduced by non-idealities not captured in the GaN HEMT model and simulation, but such variations and non-idealities are relatively consistent die to die largely due to on-going developments in GaN reliability. While NF varies from 4-10 dB across the decade coverage from 2-20 GHz, the noise performance from 12-18 GHz (4-7 dB) is on average 4 dB better than noise performance with GaN mixers operating in the Ku-band.

Since the simulations are primarily concerned with the ability of the mixer to operate linearly while in the presence of a high power co-side emitter, FIG. 14C shows the simulated vs. measured degradation in NF as there is an increase in-band power representative of the worst-case co-site in-band emitter. NF degradation data is plotted for 12 GHz since there is minimal discrepancy between simulation and measurement and the frequency is at the center of the mixer frequency coverage. In FIG. 14C, at 0 dBm, 5 dBm, and 10 dBm, the error between simulation and measurement is less than 0.1 dB, which is consistent with expectations that linearity parameters in large signal model are sufficiently accurate and repeatable under current bias. Simulated and measured 1 dB desensitization at 12 GHz occurs at approximately 10.9 dBm input power.

To show that 1 dB NF degradation will dominate over 1 dB compression, such that imperfect LO and LO noise mixing with $2^{nd}$ harmonic non-linearity will cause desensitization at lower power levels than the onset of compression due to velocity saturation, FIG. 14D shows that 1 dB compression of the in-band tone with 12 GHz LO occurs at approximately 20 dBm of input power, 10 dB greater power than the 1 dB NF desensitization power level. Simulated in-band P1 dB is 21 dBm while measured P1 dB is 19.1 dBm.

Additionally, while in-band desensitization may be the worst-case operation, the swept filtering properties of using an N-path architecture with impedance transparency also provide additional linearity benefits for co-site emitter power that is out-of-band from the receive band. To characterize the linearity performance improvement as the emitter's frequency-location moves away from the receive band, fix an in-band tone at 12.1 GHz with a 12 GHz LO and sweep a $2^{nd}$ RF input in both power from −10 to 25 dBm and frequency from 9 to 15 GHz measuring the 1 dB cross-compression point of the 100 MHz signal at baseband. In FIG. 14D, the measured cross compression point, B1 dB, is plotted versus frequency offset from the LO where 25 dBm represents the maximum measurable input power due to de-embedded losses in the RF measurement path. Far out-of-band, noise figure desensitization is negligible even under 10 dBm of co-site emitter power.

The simulation and measurement included establishing a co-site emitter resilience figure of merit (CSER FoM). A predictive metric for dynamic range is spurious free dynamic range (SFDR). However, in-band desensitization dynamic range (DDR) is a measure that captures the interdependence between sensitivity and power handling which is particularly relevant for operational scenarios involving a single dominant co-site, co-frequency, high-power emitter. DDR is defined as the power ratio (in dB) of the signal power that corresponds to a 1 dB degradation in the receiver noise figure (P1 $dB_{ND}$ in dBm) to the degraded receiver noise floor ($NF_{ND}$ in dBm/Hz). For applications demanding resilience with wide instantaneous bandwidth, DDR may be computed in-band but sufficiently offset from center to be in the region of white phase noise. However, DDR does not describe sub-system resilience achieved through frequency agility/coverage for co-site high-power emitters that may not necessarily be co-frequency. Thus, the receiver emitter resilience FoM according to an embodiment is the product of in-band DDR and the fractional bandwidth of frequency coverage (%) given as:

$$\text{CSER FoM} = [P1 \ dB_{ND,IB} - (NF_{ND}) + 174][\text{frac} \cdot BW]$$

Where CSER FoM is the co-site emitter resilience figure of merit, where thermal noise spectral density is-174 dBm/Hz at T=290 K. Here, the simulation achieves 176.83 dB/Hz DDR and CSER FoM 28,929. Table I below summarizes simulation performance benchmarking compared to high linearity III-V mixers where the comparison optimistically extrapolates DDR for in-band P1 dB equal to P1 $dB_{ND,IB}$. This estimation is accurate for sensitivity degradation due entirely to compression, but cannot be easily estimated if not measured. Even so, the measured DDR, tuning range, and thus CSER FoM out-perform conventional III-V mixers as illustrated in Table 1.

TABLE 1

| | COMPARISON WITH STATE-OF-THE-ART III-V MIXERS COVERING S-BAND TO KU-BAND | | | |
|---|---|---|---|---|
| Architecture | This Work 4-phase active N-path down-converter | [5] 4-phase series N-path down-converter | [7] Single-balanced resistive mixer | [4] 4-phase N-path down-converter |
| Frequency Range (GHz) | 2-20 | 15.5-18.5 | 12-16 | 3-12 |
| Fractional BW of Freq Range (%) | 163.6 | 17.6 | 28.6 | 120 |
| Noise Figure/Average (dB) | 4→10/7.1 | 8.6 → 10.5/9.5 | 9→ 13/10.5 | 9 → 17/12.1 |
| 1 dB in-band NF desense (dBm) | 10.93 | 8.8 * | 0 ** | −7.5 ** |

TABLE 1-continued

| | COMPARISON WITH STATE-OF-THE-ART III-V MIXERS COVERING S-BAND TO KU-BAND | | | |
| --- | --- | --- | --- | --- |
| Architecture | This Work 4-phase active N-path down-converter | [5] 4-phase series N-path down-converter | [7] Single-balanced resistive mixer | [4] 4-phase N-path down-converter |
| In-band P1dB (dBm) | 19.1 | 8.8 * | -1 → 1 | -7.5 |
| Out-of-Band B1dB (dBm) | >25 | 11.03 → 9.33 | N/R | 19 |
| LO Power (dBm) | 16 | 11 | 10 | >30 (digital) |
| In-band Desensitization DR (dB/Hz) | 176.83 | 172.3 * | 162.5 | 153.4 |
| Co-Site Emitter Resilience FoM | 28,929 | 3,032 * | 4,648 ** | 18,408 ** |
| Technology | 40 nm T-gate GaN | 120 nm GaN-on-SiC | AlGaN/ GaN | GaAs w/Si |

* P1dB$_{ND, IB}$ & P1dB optimistically extrapolated from in-band IIP3
** P1dB$_{ND, IB}$ optimistically taken as average P1dB

REFERENCES IN TABLE 1

[5] D. Dimlioglu and A. C. Molnar, "*Demonstration of a Ku-Band N-Path Downconverter in GaN-on-SiC,*" 2023 IEEE BiCMOS and Compound Semiconductor Integrated Circuits and Technology Symposium (BCICTS), Monterey, CA, USA, 2023;

[7] M.-N. Do, et al., "*AlGaN GaN mixer MMICs, and RF front-end receivers for C-, Ku-, and Ka-band space applications,*" The 5th European Microwave Integrated Circuits Conf., Paris, France, 2010; and

[4] M. Morton, et. al., "The RF Sampler: Chip-Scale Frequency Conversion and Filtering Enabling Affordable Element-Level Digital Beamforming," 2018 IEEE BCICTS, San Diego, CA, USA, 2018.

The embodiment and simulation data for receiver circuit 1000 of FIG. 10 illustrate a 2-20 GHz decade-wide tunable ultra-high dynamic range down-conversion front-end implemented in 40 nm mm-wave GaN. The active mixer embodiment illustrated in the receiver circuit 1000 may be used for high sensitivity receivers operating in the presence of co-site, co-frequency, high-power emitters. According to an embodiment, the active mixer may achieve 19 dBm in-band compression and >10 dBm in-band 1 dB NF desensitization at 12 GHz with close agreement between simulation and measurement. Out-of-band less than 1 dB cross-compression was measured in the presence of 25 dBm. The down-converting GaN active mixer embodiment achieves 4-10 dB NF across 2-20 GHz and achieves 4 dB better NF compared to conventional GaN passive mixers when narrowing the data to the Ku-band. All measurements were taken under 2.5V drain bias with 16 dBm single-ended LO input to off-chip hybrid and balun modules. Compared to a conventional GaN passive mixer, the active mixer embodiment illustrated in receiver circuit 1000 presents an estimated 12 dB improvement in SFDR over 9.3× larger fractional bandwidth of tunable frequency coverage. The active mixer core embodiment demonstrated in the simulation is one component of a larger high-dynamic range receiver architecture and occupies 2.5 mm×0.5 mm active die area. To quantify the utility of receiver architectures for operating in the presence of co-site emitters, the disclosed embodiment defines a FoM for co-site emitter resilience.

A number of example embodiments have been described. Nevertheless, it will be understood that various modifications may be made without departing from the spirit and scope of the devices and methods described herein.

What is claimed is:

1. A receiver circuit for baseband down-conversion of a radio frequency (RF) input signal, the RF input signal having a center frequency, the receiver circuit comprising:
an RF input terminal that receives the RF input signal;
a direct voltage (DC) voltage supply rail that provides a DC voltage supply;
a shared current source configured to draw a shared bias current from the DC voltage supply;
a ground terminal coupled to one end of the shared current source;
a plurality of baseband down-conversion paths configured to provide a plurality of baseband down-conversion signals, wherein each baseband down-conversion path in the plurality of baseband down-conversion paths comprises a transistor, a load impedance, and a filter capacitor configured to provide one of the baseband down-conversion signals in the plurality of baseband down-conversion signals;
a sinusoidal local oscillator configured to generate a plurality of phase-shifted sinusoidal voltage signals, wherein each phase-shifted sinusoidal voltage signal has a signal frequency that is substantially the same as the center frequency and a time varying amplitude; and
wherein for each baseband down-conversion path:
the load impedance has one end coupled to the voltage supply rail;
the transistor has a source coupled to the RF input terminal and to another end of the shared current source, a drain coupled to another end of the load impedance and to one end of the filter capacitor, and a gate coupled to the sinusoidal local oscillator to receive one of the plurality of phase-shifted sinusoidal voltage signals;
the drain of the transistor is configured to provide a mixed signal in response to the time varying amplitude of the one of the plurality of phase-shifted sinusoidal voltage signals, the shared bias current, and the RF input signal; and
the filter capacitor is configured to provide the one of the baseband down-conversion signals in response to the mixed signal.

2. The receiver circuit of claim 1, wherein:
the DC voltage supply is configured as a pull-up supply; and
the shared current source comprises an inductor configured as an RF choke and a DC biasing inductor shunt to the ground terminal.

3. The receiver circuit of claim 1, wherein the load impedance is a load resistor.

4. The receiver circuit of claim 1, wherein the shared bias current is cyclically steered to the transistor in each baseband down-conversion path in response to the time varying amplitude of the one of the plurality of phase-shifted sinusoidal voltage signals at the gate of the transistor.

5. The receiver circuit of claim 1, wherein for each baseband down-conversion path, the load impedance and the filter capacitor are configured as a low a pass filter to provide the one of the baseband down-conversion signals in response to the mixed signal.

6. The receiver circuit of claim 1, wherein:

each baseband down-conversion path comprises a low pass filter coupled to the drain of the transistor and the load impedance; and the low pass filter comprises the filter capacitor.

7. The receiver circuit of claim 1, further comprising:

a frontend monolithic microwave integrated circuit (MMIC) fabricated on a substrate comprising a gallium nitride (GaN) material;

wherein:

the transistor in each baseband down-conversion path is a high electron mobility transistor (HEMT); and the MMIC comprises the sinusoidal local oscillator, and the transistor and the load impedance of each baseband down-conversion path.

8. The receiver circuit of claim 7, further comprising:

a backend silicon integrated circuit (IC) coupled to the frontend MMIC;

wherein:

the backend silicon IC comprises a frequency synthesizer configured to provide a single-ended sinusoidal voltage signal having the signal frequency; and the sinusoidal local oscillator is a tunable sinusoidal local oscillator that generates the plurality of phase-shifted sinusoidal voltage signals in response to the single-ended sinusoidal voltage signal.

9. The receiver circuit of claim 7, further comprising:

a backend silicon integrated circuit (IC) coupled to the frontend MMIC;

wherein:

the backend silicon IC comprises a plurality of amplifiers, wherein each amplifier is coupled to the drain of the transistor in each baseband down-conversion path.

10. The receiver circuit of claim 9, wherein each amplifier in the plurality of amplifiers is configured as a low pass amplifier comprising the filter capacitor in each baseband down-conversion band.

11. The receiver circuit of claim 1, wherein for each baseband down-conversion path, the shared bias current is steered to the transistor in response to the time varying amplitude of the one of the plurality of phase-shifted sinusoidal voltages signals associated with the gate of the transistor.

12. A receiver circuit for baseband down-conversion of a radio frequency (RF) input signal from an antenna, the input signal having a center frequency, the receiver circuit comprising:

an RF input terminal configured to receive the RF input signal;

a direct current (DC) voltage supply rail configured to provide a DC voltage supply;

a shared current source configured to draw a shared bias current from the DC voltage supply;

a ground terminal coupled to one end of the shared current source;

N baseband down-conversion paths, wherein an $n^{th}$ baseband down-conversion path comprises an $n^{th}$ transistor, an $n^{th}$ load impedance, and an $n^{th}$ filter capacitor to generate an $n^{th}$ baseband down-conversion signal, where the subscript n is an integer 1 to N and N is an integer of 2 or more and corresponds to a number of baseband down-conversion paths in N baseband down-conversion paths; and a sinusoidal local oscillator configured to generate an $n^{th}$ sinusoidal voltage signal having a signal frequency that is substantially the same as the center frequency, the $n^{th}$ sinusoidal voltage signal having an $n^{th}$ phase angle and a time varying amplitude;

wherein:

the $n^{th}$ load impedance has one end coupled to the DC voltage supply rail;

the $n^{th}$ transistor has a source coupled to the RF input terminal and to another end of the shared current source, a drain coupled to another end of the $n^{th}$ impendence load and to one end of the $n^{th}$ filter capacitor, and a gate coupled to the sinusoidal local oscillator to receive the $n^{th}$ sinusoidal voltage signal;

the drain of the $n^{th}$ transistor is configured to provide an $n^{th}$ mixed signal associated with the $n^{th}$ phase angle in response to the time-varying amplitude of the $n^{th}$ sinusoidal voltage signal, the shared bias current, and the RF input signal; and the $n^{th}$ filter capacitor is configured to provide the $n^{th}$ baseband down-conversion signal in response to the $n^{th}$ mixed signal.

13. The receiver circuit of claim 12, wherein the $n^{th}$ load impedance is a load resistor.

14. The receiver circuit of claim 12, wherein the DC voltage supply is configured as a pull-up supply and the shared current source comprises an inductor configured as an RF choke and a DC biasing inductor shunt to the ground terminal.

15. The receiver circuit of claim 12, wherein the shared bias current is cyclically steered to the $n^{th}$ transistor in response to the time varying amplitude of the $n^{th}$ sinusoidal voltage signal at the gate of the $n^{th}$ transistor.

16. The receiver circuit of claim 12, wherein for the $n^{th}$ baseband down-conversion path, the $n^{th}$ load impedance and the $n^{th}$ filter capacitor are configured as an $n^{th}$ low pass filter to provide the $n^{th}$ baseband down-conversion signal in response to the $n^{th}$ mixed signal.

17. The receiver circuit of claim 12, wherein:

the $n^{th}$ baseband down-conversion path comprises an $n^{th}$ low pass filter coupled to the drain of the $n^{th}$ transistor and the $n^{th}$ load impedance; and the $n^{th}$ low pass filter comprises the $n^{th}$ filter capacitor.

18. The receiver circuit of claim 12, further comprising:

a frontend monolithic microwave integrated circuit (MMIC) fabricated on a substrate comprising a gallium nitride (GaN) material;

wherein:

the $n^{th}$ transistor in the $n^{th}$ baseband down-conversion path is a high electron mobility transistor (HEMT); and the MMIC comprises the sinusoidal local oscillator, and the $n^{th}$ transistor and the $n^{th}$ load impedance of the $n^{th}$ baseband down-conversion path.

19. The receiver circuit of claim 18, further comprising:

a backend silicon integrated circuit (IC) coupled to the frontend MMIC;

wherein:

the backend silicon IC comprises a frequency synthesizer configured to provide a single-ended sinusoidal voltage signal having the signal frequency; and the sinusoidal local oscillator is a tunable sinusoidal local oscillator that generates the $n^{th}$ sinusoidal voltage signal in response to the single-ended sinusoidal voltage signal.

20. The receiver circuit of claim 11, wherein for the $n^{th}$ baseband down-conversion path, the shared bias current is steered to the $n^{th}$ transistor in response to the time varying amplitude of the $n^{th}$ sinusoidal voltage signal associated with the gate of the $n^{th}$ transistor.

21. A method of converting a radio frequency (RF) input signal having a center frequency to a baseband signal, the method comprising:

receiving the RF input signal;

generating a plurality of sinusoidal voltage signals having a signal frequency that is substantially the same as the center frequency;

provide a shared bias current;

associating a plurality of transistors with the plurality of sinusoidal voltage signals, the RF input signal, and the shared bias current;

cyclically steering the shared bias current to configure one of the plurality of transistors to operate in a saturation mode in response to a time varying amplitude of one of the plurality of sinusoidal voltage signals that drives a gate of the one of the plurality of transistors;

mixing the RF input signal and the one of the plurality of sinusoidal voltage signals associated with the one of the plurality of transistors configured in the saturation mode to generate a mixed signal, wherein the mixed signal has a phase angle that is at least partially determined by the one of the plurality of sinusoidal voltage signals that drives the gate of the one of the plurality of transistors; and filtering the mixed signal to provide the baseband signal having the phase angle of the mixed signal.

22. The method of claim 21, further comprising:

using a low pass filter for filtering filter the mixed signal to provide the baseband signal having the phase angle of the mixed signal.

23. The method of claim 21, further comprising:

providing a single-ended sinusoidal voltage signal having the signal frequency that is substantially the same as the center frequency; and tuning a sinusoidal local oscillator to generate the plurality of sinusoidal voltage signals in response to the single-ended sinusoidal voltage signal.

24. The method of claim 21, further comprising:

steering substantially all of the shared bias current to the one of the plurality of transistors when an instantaneous gate voltage from the time varying amplitude of the one of the plurality of sinusoidal voltage signals is above a saturation mode voltage threshold $V_{sat}$.

25. The method of claim 21, further comprising:

steering substantially all of the shared bias current away from another one of the plurality of transistors when an instantaneous gate voltage from the time varying amplitude of another one of the plurality of sinusoidal voltage signals associated with the gate of the other one of the plurality of transistors is below a cut-off mode voltage threshold $V_{off}$.

* * * * *